(12) United States Patent
Stephens, Jr.

(10) Patent No.: US 9,975,248 B2
(45) Date of Patent: May 22, 2018

(54) REPLICATING THE REMOTE ENVIRONMENT OF A PROXY ROBOT

(71) Applicant: Kenneth Dean Stephens, Jr., Saint George, UT (US)

(72) Inventor: Kenneth Dean Stephens, Jr., Saint George, UT (US)

(*) Notice: Subject to any disclaimer, the term of this patent is extended or adjusted under 35 U.S.C. 154(b) by 31 days.

(21) Appl. No.: 15/384,321

(22) Filed: Dec. 20, 2016

(65) Prior Publication Data

US 2017/0129105 A1    May 11, 2017

Related U.S. Application Data

(63) Continuation-in-part of application No. 13/593,518, filed on Aug. 24, 2012.

(60) Provisional application No. 61/613,935, filed on Mar. 21, 2012, provisional application No. 62/339,929, filed on May 22, 2016.

(51) Int. Cl.
  *G05B 15/00* (2006.01)
  *G05B 19/00* (2006.01)
  *B25J 9/16* (2006.01)
  *B25J 3/04* (2006.01)
  *B64G 1/10* (2006.01)
  *B64G 4/00* (2006.01)

(52) U.S. Cl.
  CPC .............. *B25J 9/1689* (2013.01); *B25J 3/04* (2013.01); *B64G 2001/1064* (2013.01); *B64G 2004/005* (2013.01); *Y10S 901/09* (2013.01); *Y10S 901/47* (2013.01)

(58) Field of Classification Search
  None
  See application file for complete search history.

(56) References Cited

U.S. PATENT DOCUMENTS

| | | | |
|---|---|---|---|
| 6,232,735 B1 * | 5/2001 | Baba ..................... | B25J 9/1689 318/567 |
| 9,674,435 B1 * | 6/2017 | Monari ............... | H04N 5/23238 |
| 2013/0211594 A1 * | 8/2013 | Stephens, Jr. .......... | B25J 9/1689 700/259 |
| 2017/0129105 A1 * | 5/2017 | Stephens, Jr. .......... | B25J 9/1689 |

* cited by examiner

*Primary Examiner* — Bhavesh V Amin

(57) ABSTRACT

A method and system for exploring a remote environment from an environment simulator at a local base is disclosed. The system includes: at least one proxy robot in the remote environment with at least one near-field and at least one high resolution 360-degree far field video camera; at least one additional device at the remote environment to capture images and data; a transmitter at the remote environment to transmit the video and data to the local base; a terrain analysis computer at the local base to receive and process the video and data to generate a 360-degree approximated real time (ART) video field representing a terrain surrounding the at least one proxy robot; a display in the environment simulator to display the ART video field for at least one user; a full body motion capture suit marked to the dimensions of the at least one user; and a plurality of motion capture video cameras to capture each position change in the motion capture suit, wherein activities performed virtually in the environment simulator represent the identical activities to be performed by the proxy robot in the terrain of the remote environment.

22 Claims, 21 Drawing Sheets

Figure 1 A-D: Human Handler Guides Proxy Robot of Same Size

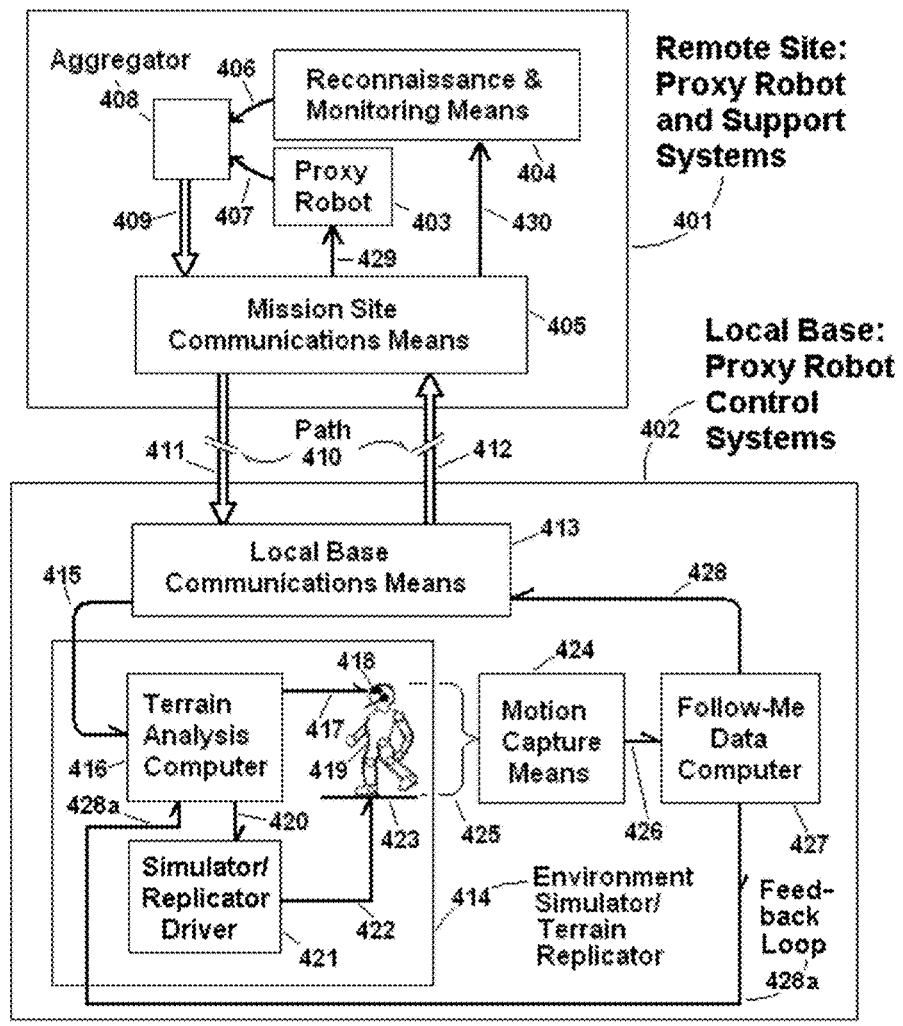
Fig. 1E: Diagram of Proxy Robotics Elements
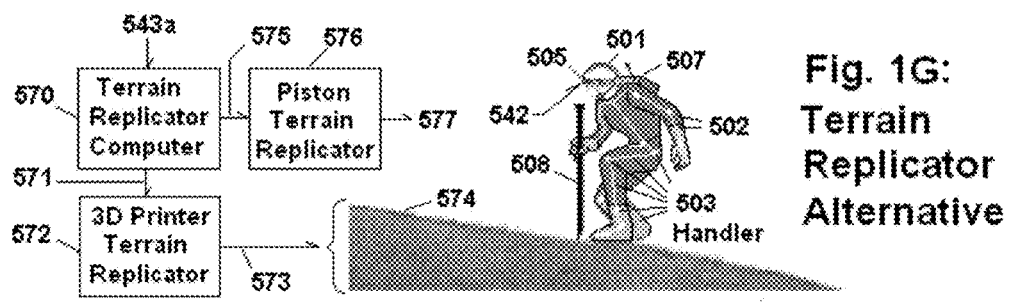
Fig. 1G: Terrain Replicator Alternative

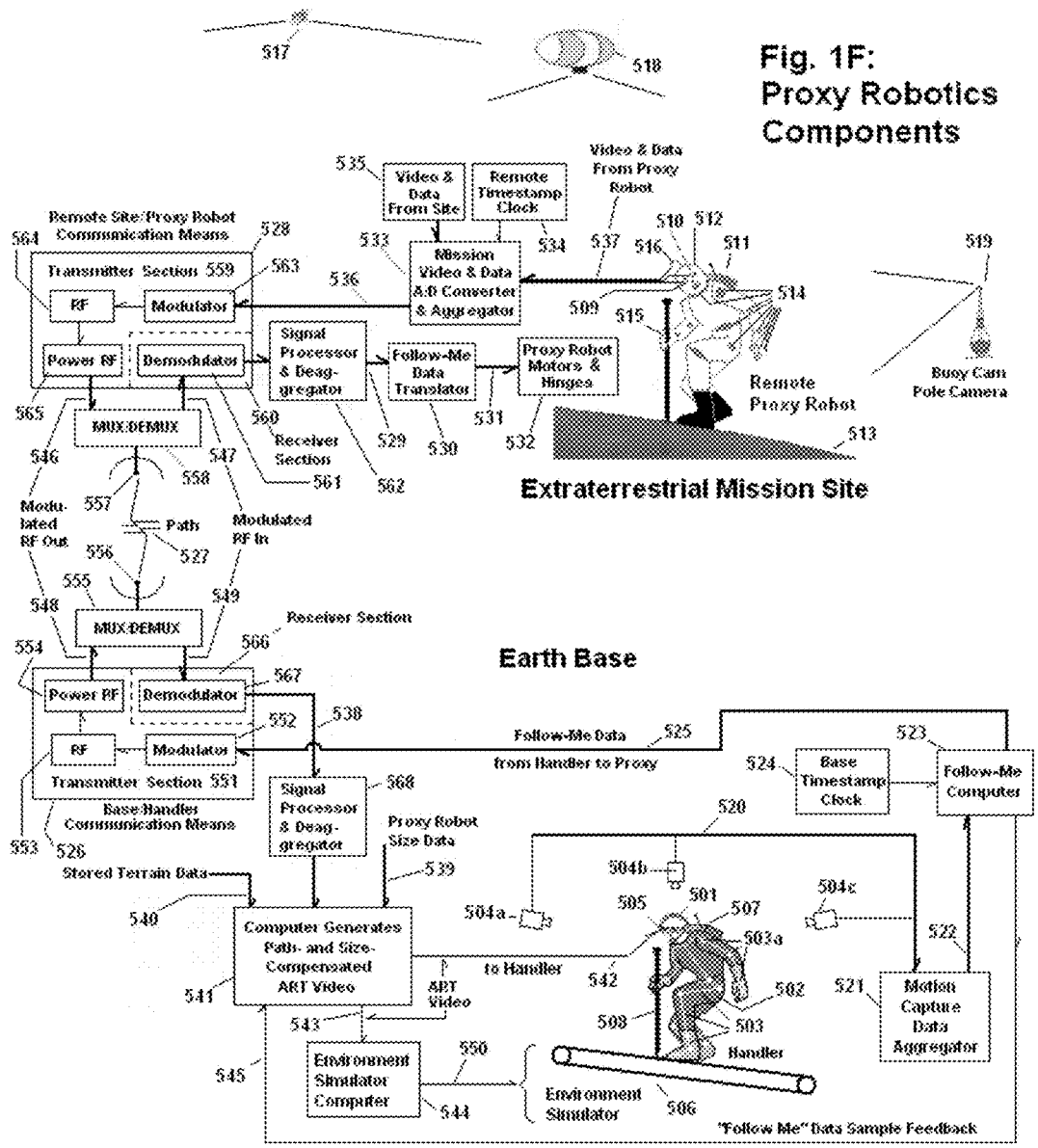

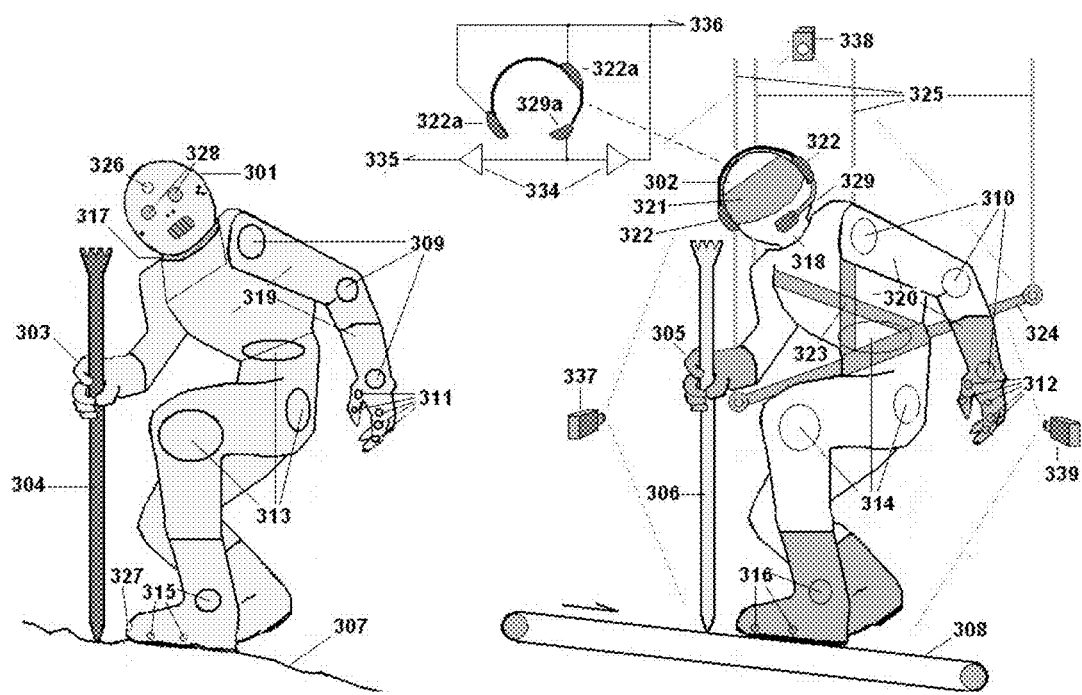

Proxy Robot Handler
Heads-Up Display

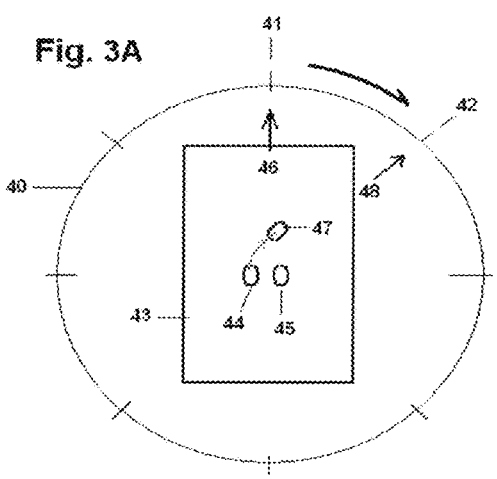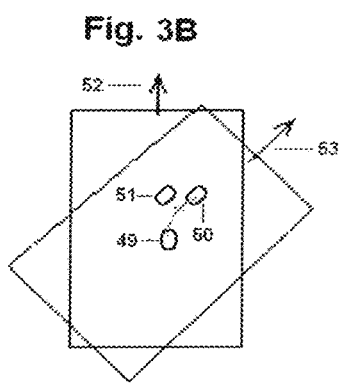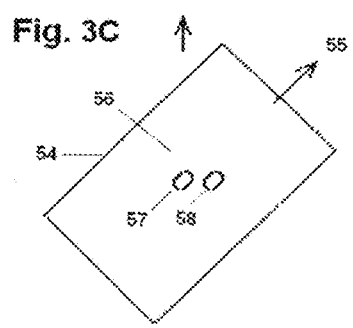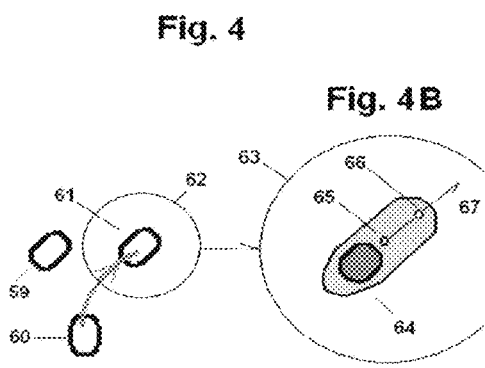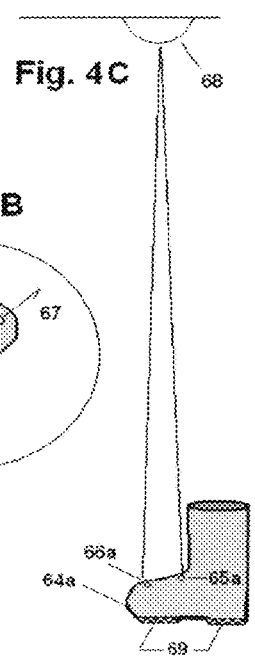

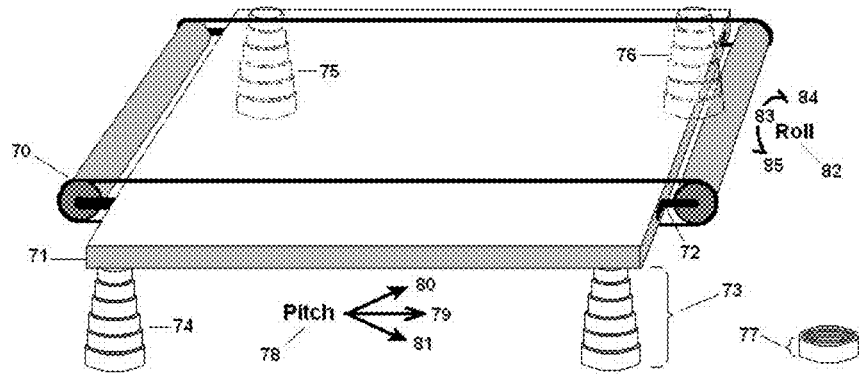
Fig. 5: Treadmill with Variable Pitch and Roll
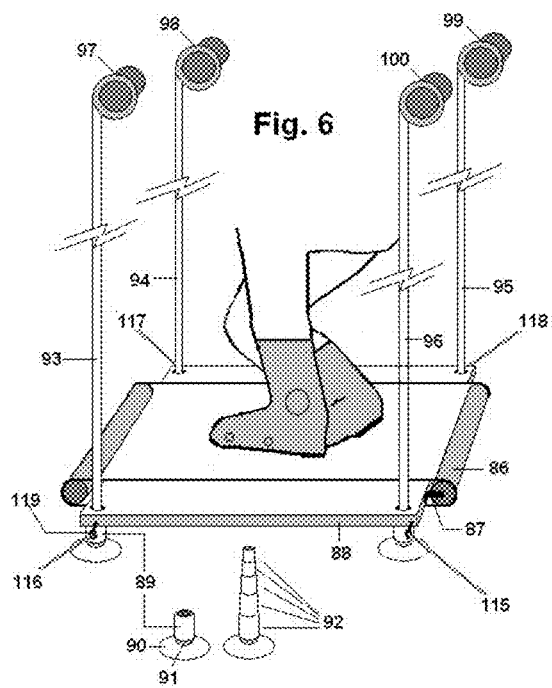
Fig. 6
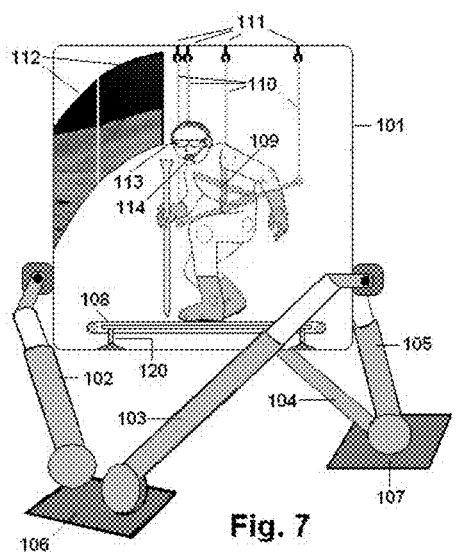
Fig. 7

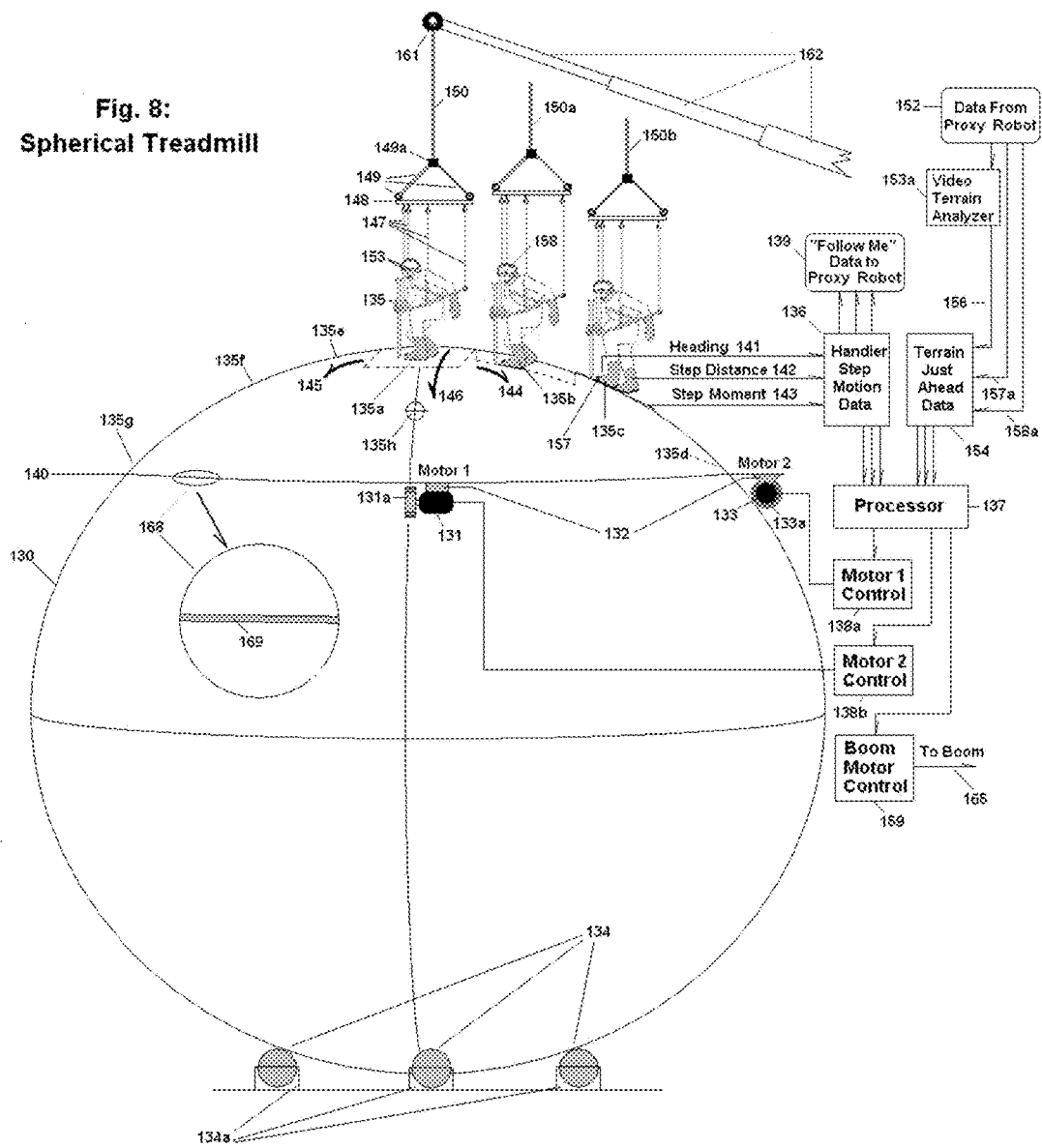

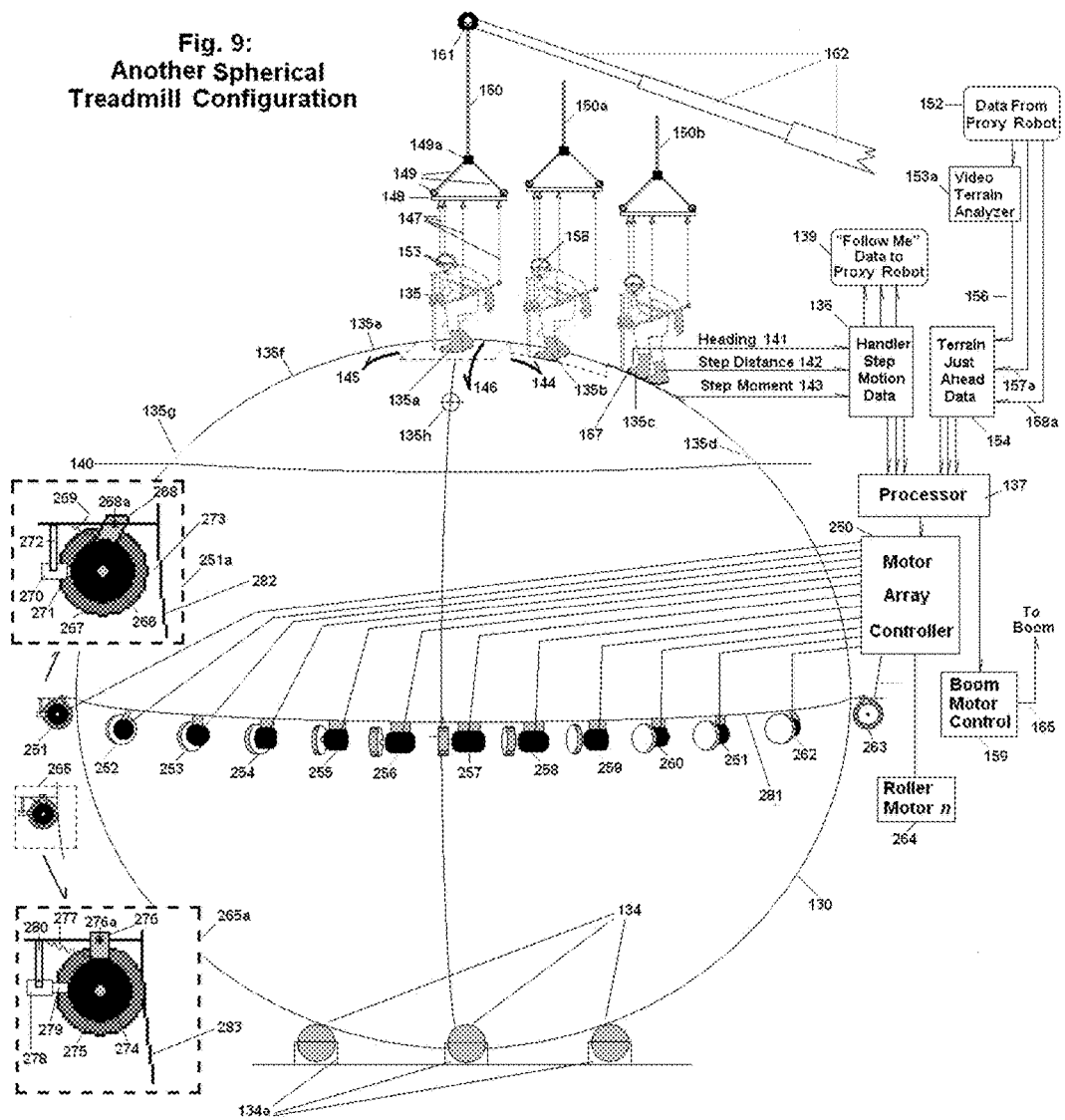

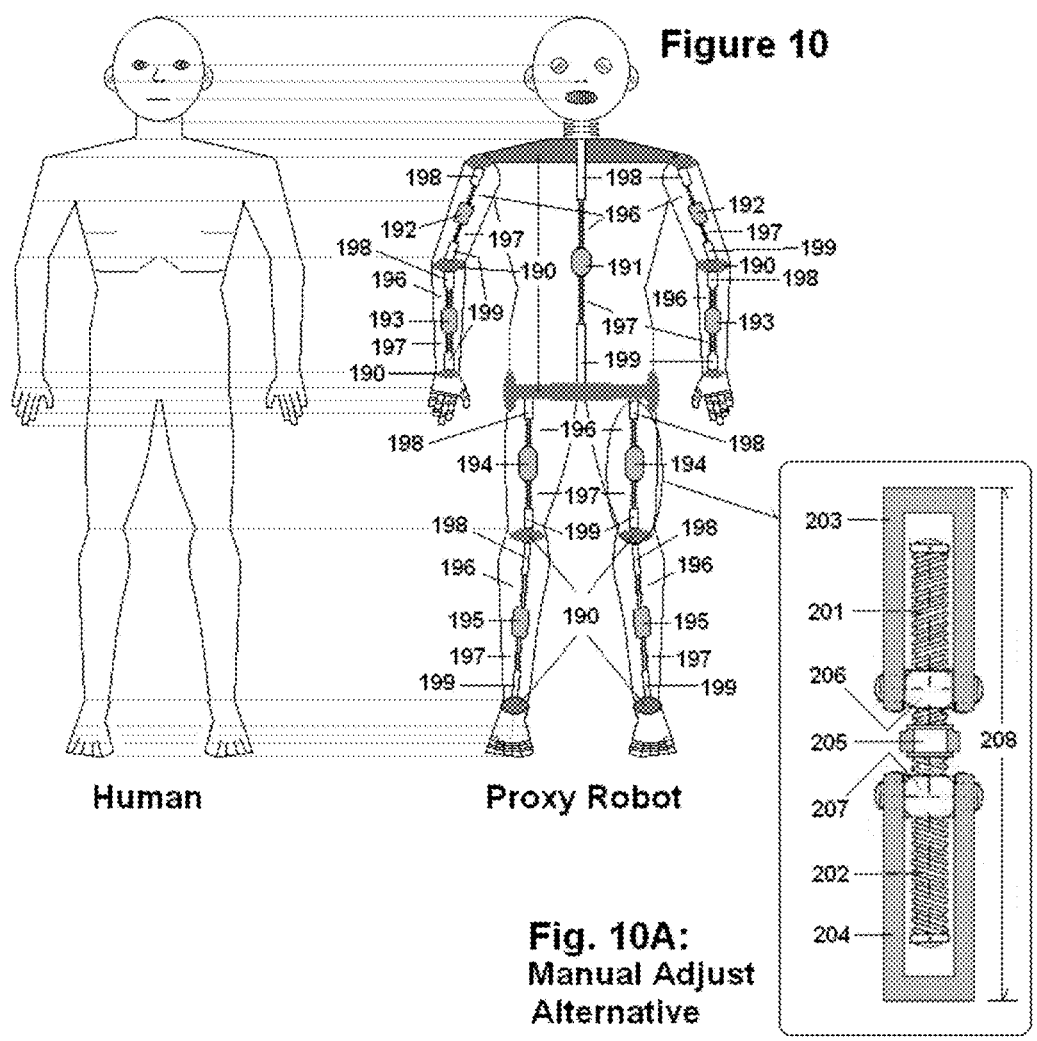

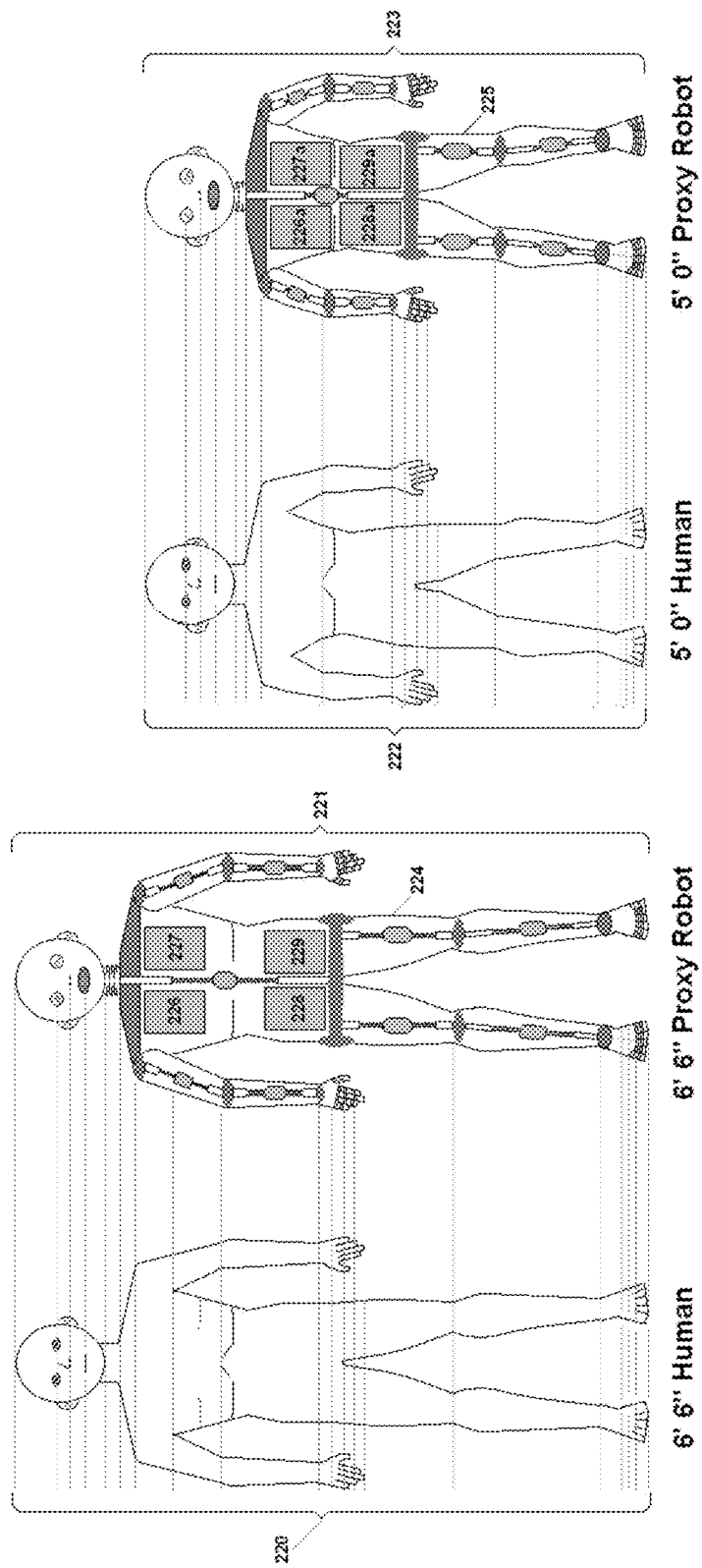
Figure 10C: Proxy Robot Adjusts Dimensions to Match Handler

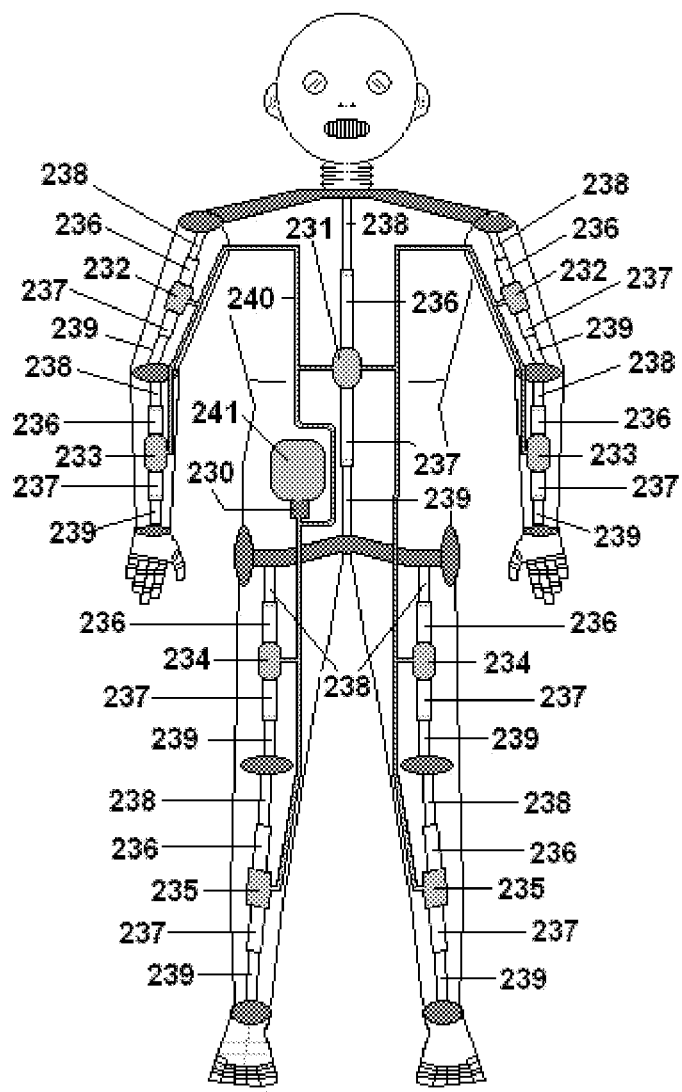
Fig. 11: Proxy Robot with Hydraulic or Pneumatic Dimension-Changing Means

Figure 12: Human Handler Guides Proxy Robot Twice as Large

FIG. 13: Proxy Robot of Half Human Handler Size

Remote Proxy with Replicator Size Compensation

Local Video Automatically Compensates for Proxy Size

Figure 15: Giant Tilt Table

Figure 16: Terrain Replicators

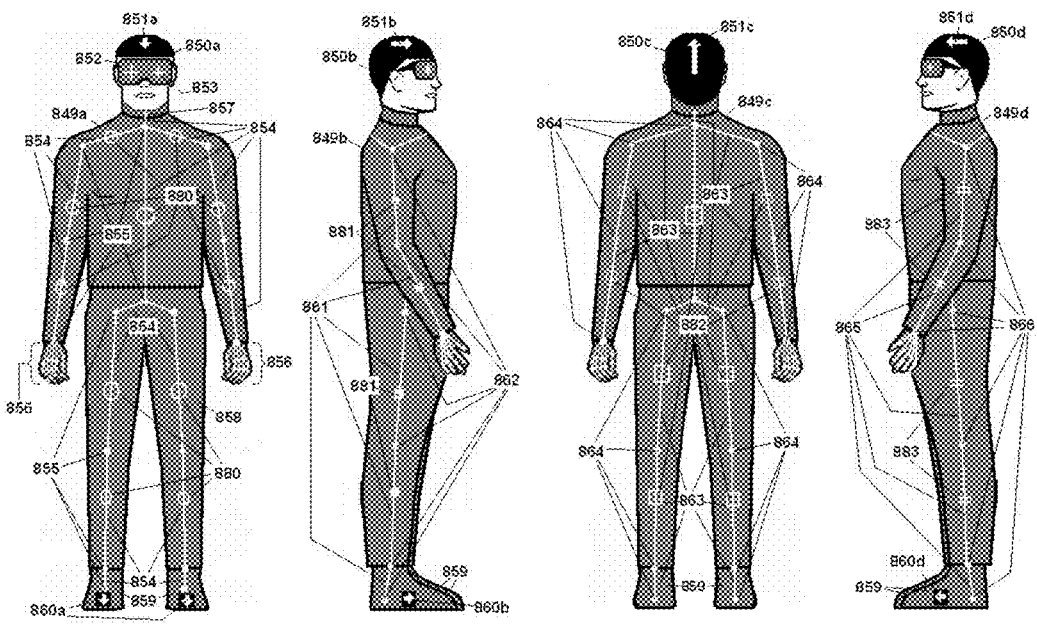
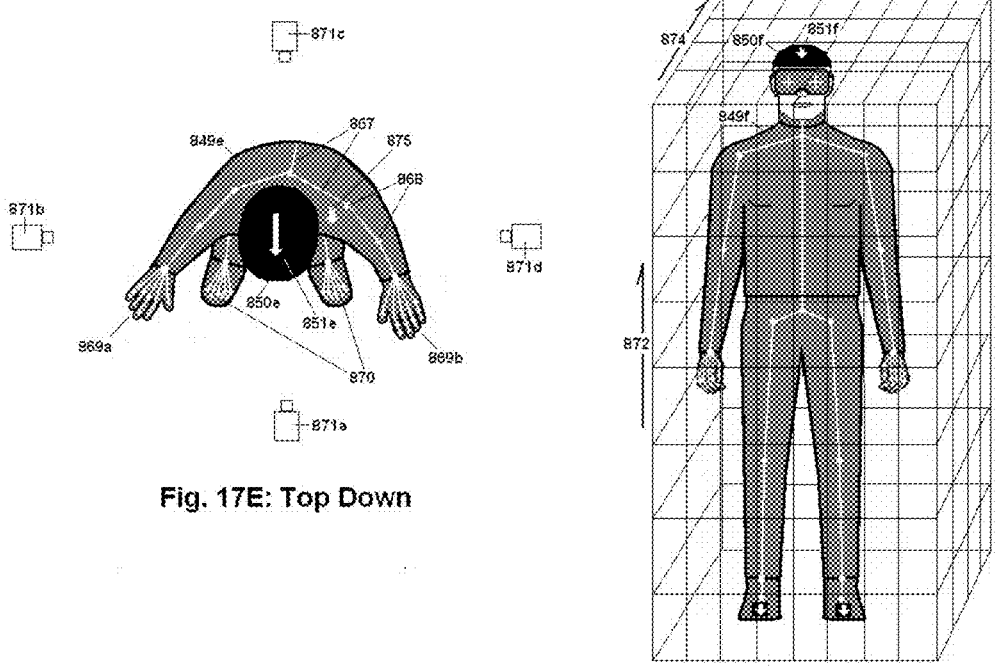
Figure 17: Simple Motion Capture Means
Fig. 17A: Front   Fig. 17B: Right Side   Fig. 17C: Rear   Fig. 17D: Left Side
Fig. 17E: Top Down
Fig. 17F: 3-D Rendering Fig. 17G: Motion Capture Stick Figures
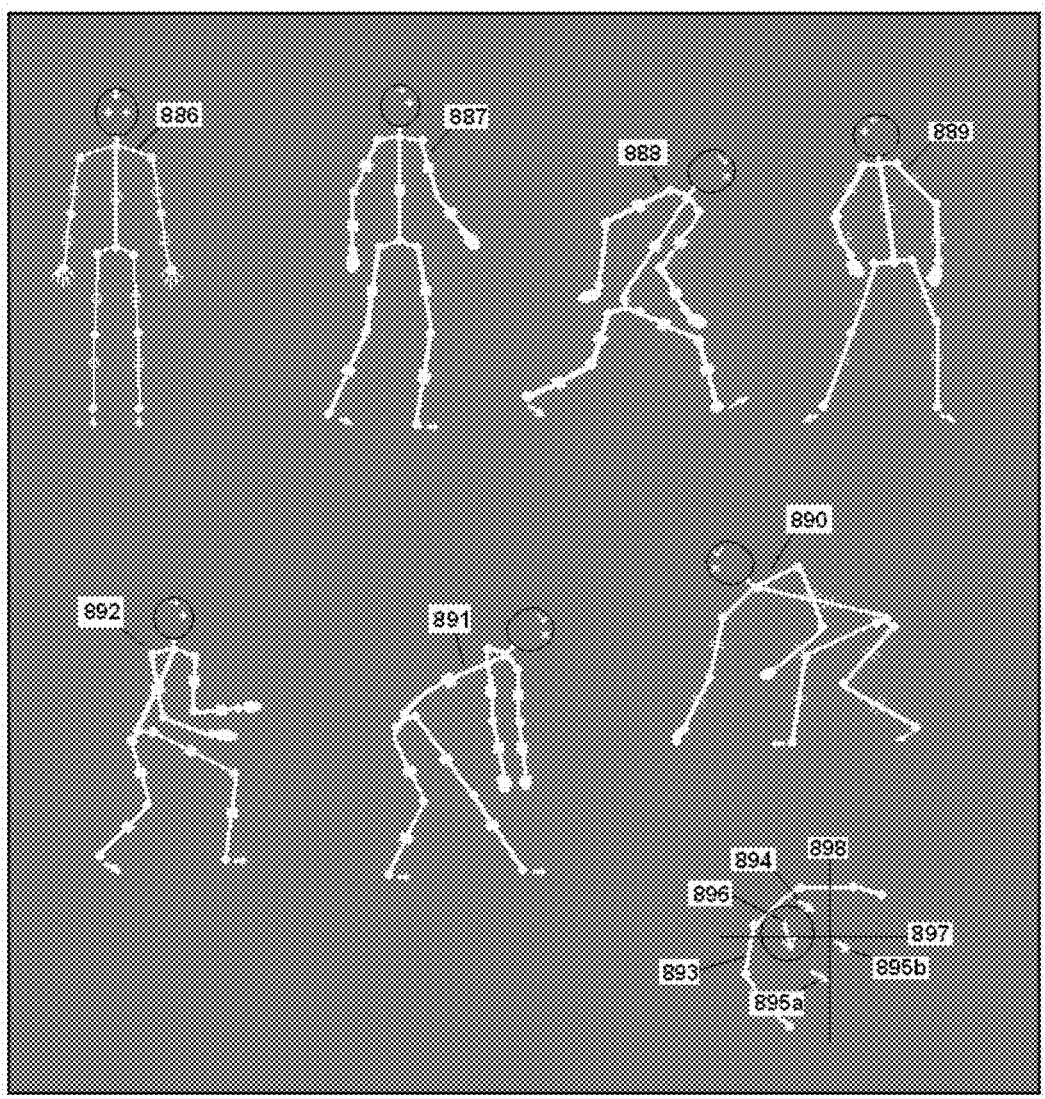

REPLICATING THE REMOTE ENVIRONMENT OF A PROXY ROBOT

CLAIM OF PRIORITY

This application is a continuation-in-part of applicant's copending U.S. application Ser. No. 13/593,518, filed Aug. 24, 2012, for "Proxy Robots and Remote Environment Simulator for Their Human Handlers." The present invention also claims priority to provisional patent application No. 61/613,935 filed on Mar. 21, 2012, entitled "Remote Environment Simulator for Human Proxy Robot Handlers," and provisional patent application No. 62/339,929, filed May 22, 2016, "Replicating the Remote Environment of a Proxy Robot for its Human Handler," incorporated herein

FIELD OF THE INVENTION

The present claimed invention generally relates to robotics. More specifically the present invention relates to robotic systems where a robot serves as proxy surrogate for a human handler in a simulated or replicated environment.

BACKGROUND

Current humanoid robots generally have a head, limbs, joints, hands and feet corresponding to those of a human. Humanoid robots are bipedal, moving about on two feet and staying balanced via software hard-coded into their motor systems or originating externally. Operating code may consist of prerecorded software algorithms or originate from a person at a keyboard, joystick or a graphical user interface (GUI). For example, the "Nao" robot produced by Aldebaran Robotics in France https://en.wikipedia.org/wiki/Nao (robot) can be programmed with C++, Python, Java, MATLAB, Urbi, C, and Net, and also runs on Windows, Mac OS and Linux GUIs. In the present invention, the operating code determining the movements of a proxy robot originates from position changes in a full body motion capture suit worn by a human, captured by motion capture cameras, transmitted over a path, and translated into language the robot understands.

DESCRIPTION OF THE DRAWINGS

FIG. 1A illustrates a proxy robot on the surface of a remote environment;

FIG. 1B depicts a human handler on the surface of a simulated environment;

FIG. 1C is a close-up view of a proxy robot in a remote environment;

FIG. 1D is a close-up view of a human handler in a simulated environment;

FIG. 1E is a diagram of the elements in proxy robotics;

FIG. 1F is a detailed block diagram of the components of proxy robotics;

FIG. 1G is a block diagram showing a terrain replicator alternative to the environment simulator in FIG. 1F;

FIG. 2A depicts a proxy robot, its human handler, and an exemplary embodiment of a headset's electronic circuit;

FIG. 3A illustrates an exemplary embodiment of a handler position on a treadmill;

FIG. 3B illustrates another exemplary embodiment of a handler position on a treadmill;

FIG. 3C illustrates an exemplary embodiment of the treadmill of FIG. 3A in a new heading;

FIG. 4 illustrates an exemplary embodiment of the orientation of a turntable;

FIG. 4A illustrates an exemplary embodiment of the handler's foot movement;

FIG. 4B illustrates an exemplary embodiment of a magnified and more detailed top-down view of the right boot;

FIG. 4C illustrates an exemplary embodiment of an overhead reader noting the position of markers atop the boots of the handler's body suit;

FIG. 5 illustrates an exemplary embodiment of a treadmill mounted to a stand with appropriate mounting hardware;

FIG. 6 illustrates an exemplary embodiment of a method and apparatus for adding pitch and roll;

FIG. 7 illustrates an exemplary embodiment of another method and apparatus for the addition of pitch and roll to a treadmill simulator;

FIG. 8 illustrates an exemplary embodiment of a spherical treadmill with variable pitch, roll and infinitely variable heading;

FIG. 9 illustrates another exemplary embodiment of a spherical treadmill with variable pitch, roll and infinitely variable heading;

FIG. 10 illustrates an exemplary embodiment of methods and apparatus for the adjustment of key proxy robot dimensions;

FIG. 10A illustrates a manually-adjusting turnbuckle-like element, magnified for clarity;

FIG. 10C illustrates an exemplary embodiment of a proxy robot with dimensions adjusted to match large and small human handlers;

FIG. 11 illustrates an exemplary embodiment of a proxy robot with hydraulic size adjustment means;

FIG. 12 illustrates an exemplary embodiment of a proxy robot in a remote location controlled by a human handler approximately half the robot's size;

FIG. 13 illustrates an exemplary embodiment of a proxy robot in a remote location controlled by a human handler approximately twice the robot's size;

FIG. 15 illustrates an exemplary embodiment of a set of drawings depicting a giant tilt table as simulator;

FIG. 16 illustrates an exemplary embodiment of a set of drawings depicting terrain replicator means;

FIG. 17 illustrates an exemplary embodiment of a relatively simple motion capture means;

FIG. 17A illustrates an exemplary embodiment of a front view of the body suit of a human handler;

FIG. 17B illustrates an exemplary embodiment of a right side view of the body suit of a human handler;

FIG. 17C illustrates an exemplary embodiment of a rear view of the body suit of a human handler;

FIG. 17D illustrates an exemplary embodiment of a left side view of the body suit of a human handler;

FIG. 17E illustrates an exemplary embodiment of a top-down view of the body suit of a human handler;

FIG. 17F illustrates an exemplary embodiment of a 3-D rendering of the body suit of a human handler; and FIG. 17G illustrates an exemplary embodiment of motion capture stick figures.

DETAILED DESCRIPTION OF THE INVENTION

FIGS. 1 A-D illustrate a method of environment replication previously taught by the inventor (Stephens '437, cited below).

Figure 1A:
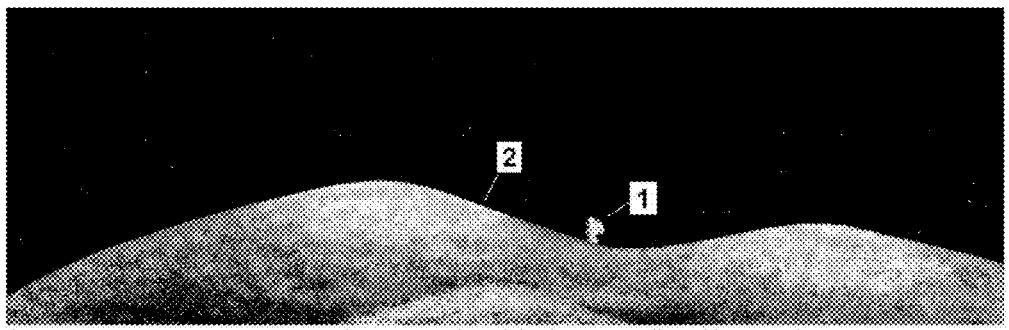
FIG. 1A-D is a set of drawings depicting a proxy robot in a remote location controlled by a human handler of approximately the same size.

In FIG. 1A, a proxy robot 1 is climbing a hill 2 in a remote environment such as the Moon or Mars.

Figure 1B:
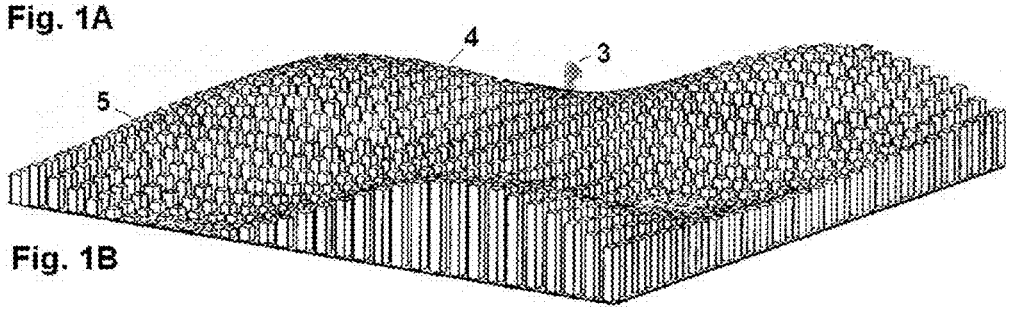
Figures 16A, 16B, 16C, 16D, 16E, 16F:
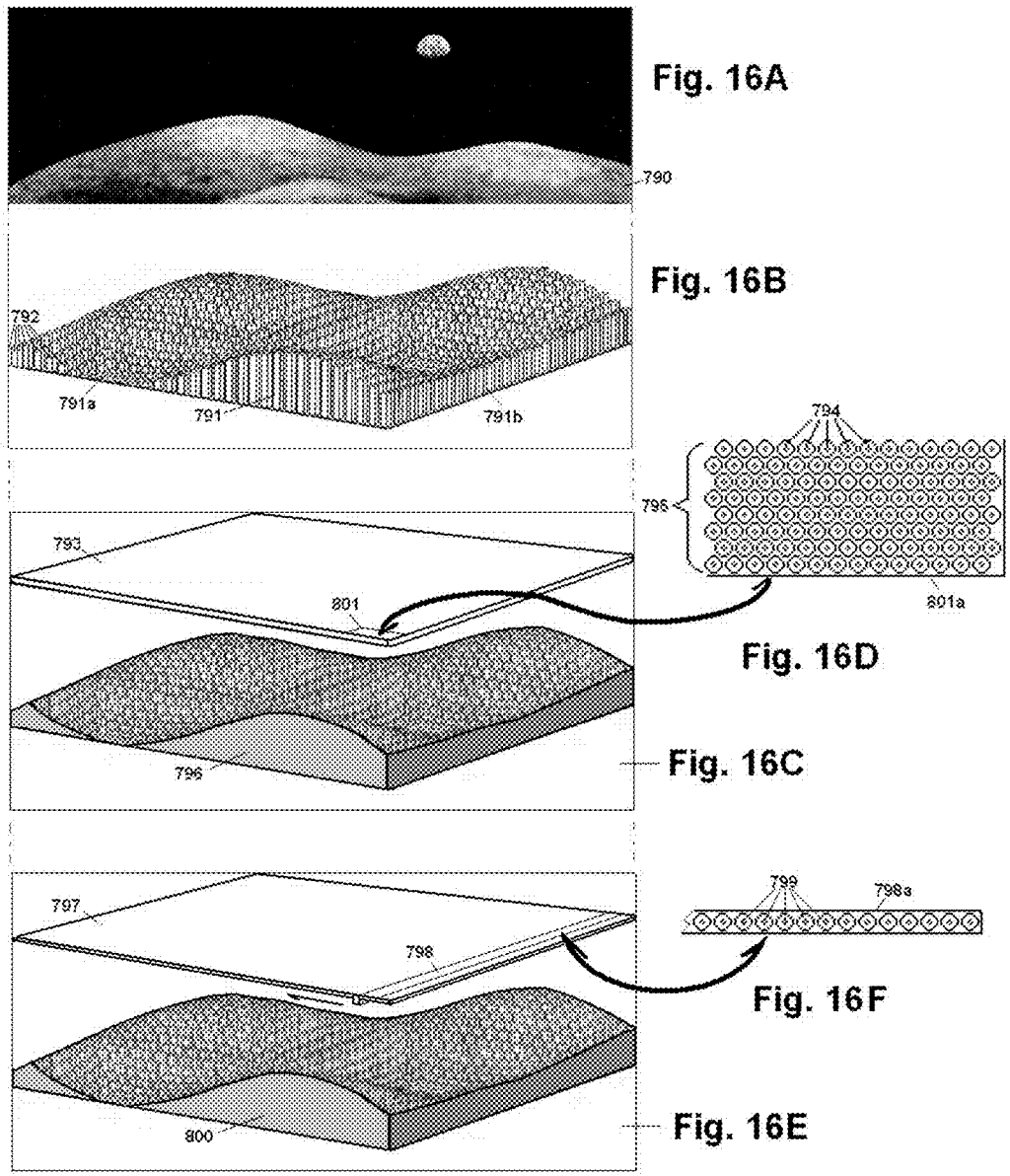
FIG. 16A illustrates an exemplary embodiment of a remote environment.
FIG. 16B illustrates an exemplary embodiment of a simulation of the environment in FIG. 16A.
FIG. 16C illustrates an exemplary embodiment of an apparatus for replicating an environment.
FIG. 16D illustrates an exemplary embodiment of a close-up view of one portion of FIG. 16C.
FIG. 16E illustrates an exemplary embodiment of another apparatus for replicating an environment.
FIG. 16F illustrates an exemplary embodiment of a close-up view of one portion of FIG. 6E.

In FIG. 1B, that same environment and hill are replicated 4 by a terrain replicator like the one taught in the descriptions of FIGS. 5A-B and 6A-C in Stephens' co-pending U.S. patent application Ser. No. 14/271,437, "Enhanced Environment Simulator for Proxy Robot Handlers," filed on May 6, 2014 and incorporated in full herein by reference. Reference is also made to FIG. 16 below, where FIG. 16A topographically illustrates terrain 790 at a remote site such as the Moon, while FIG. 16B demonstrates how the terrain in FIG. 16A can be rendered into a three-dimensional (3-D) bar chart 791. FIG. 16B has a plurality of individual bar elements 792, with each bar repesenting average height above some zero reference baseline 791a, 791b, demonstrating how actual topographies can be rendered into 3-D bar charts utilizing current technology. The terrain replicator in FIG. 1B physically replicates the 3-D bar chart by translating each chart element into a signal acting on a piston rod and selectively pushing up piston rods in a matrix 5 to form, for example, a physical hill 4 with the same dimensions as the hill 2 in FIG. 1A above. Beginning to climb the hill is a human operator 3, hereinafter called the handler of the remote proxy robot. Note that the proxy robot 1 and human handler 3 are shown to be the same size.

Figure 1C:
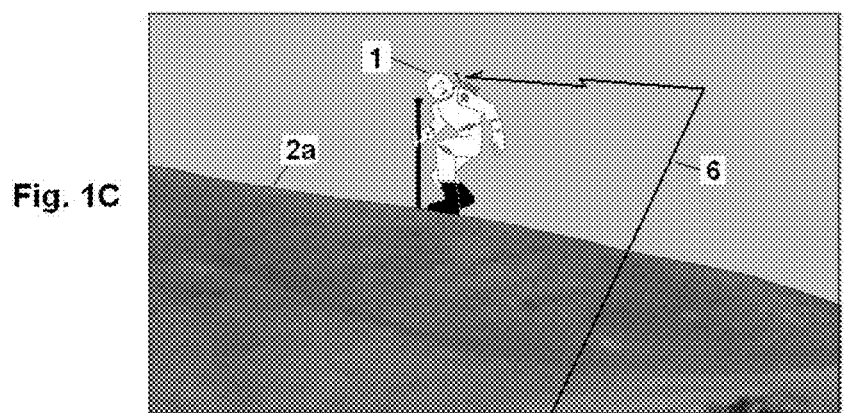

FIG. 1C is a magnified view of that portion of FIG. 1A that includes proxy robot 1 climbing hill 2a, while line 6 illustrates two-way communication between proxy robot 1 and human handler 3.

Figure 1D:
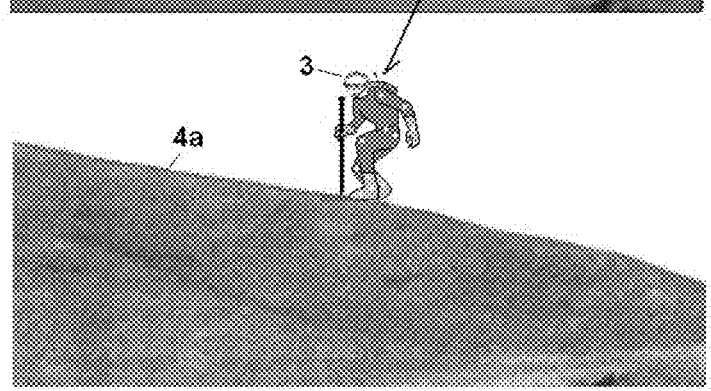

Communication connection 6 continues into FIG. 1D, with human handler 3 climbing a replica hill 4a that has been generated by a terrain replicator as discussed above. Note once more that the proxy robot 1 and human handler 3 are essentially equal in size, with the proxy robot 1 intentionally constructed or adjusted to match proportional dimensions of handler 3.

FIG. 1E is a block diagram depicting the various elements of a system for space exploration utilizing proxy robotics. The top section 401 depicts the remote mission site, including the proxy robot and its support systems, while the bottom section 402 depicts the local base with proxy robot control systems. Remote site 401 and local base 402 are connected via communications means 405 at the site in space and 413 at the local base. Between communication means 405 and 413 is a path 410, for example, a path between Mars and the Earth.

Reconnaissance and monitoring means 404 surveil the remote mission site, particularly the area immediately surrounding a proxy robot 403. Video and data 406 from the reconnaissance means is combined with near-field and high resolution far-field video 407 from the proxy robot by data aggregator 408, then sent 409 to mission site communications means 405 for transmission 411 over path 410 to local base communications means 413.

The received video and data stream 415 enters the environment simulator/terrain replicator subsection 414 at the local base, directed into terrain analysis computer 416 which produces an approximated real time (ART) video stream 417 for human handler 419 display means 418, providing a 360-degree view of the terrain surrounding proxy robot 403 at a path-compensated time in the future and at a location being determined by the movements of a human handler 419 in an environment simultor/terrain replicator 423. Separate data 420 from terrain analysis computer 416 goes to simultor/replicator driver 421 causing 422 simulator/replicator means 423 to simulate or physically replicate the terrain under and surrounding the remote proxy robot at that path-compensated time (see below).

Motion capture means 424 captures every movement and position 425 of handler 419, streaming the resulting signals 426 to follow-me data computer 427, which in turn produces follow-me data 428 for transmission 412 by local communication means 413. Mission site communications means 405 passes the follow-me data 429 to a translator which translates the data into signals driving the motor systems in proxy robot 403, thereby enabling the robot to emulate its human handler.

An important element in the simulator/replicator is feedback loop 428a which tracks the virtual position of handler 419. Although feedback loop 428a is more likely to originate at follow-me data computer 427 as depicted, it may also come from a sample of the tracking signals from motion capture means 424, simulator/replicator stage 423 or other tracking means described elsewhere in the specification. Feedback loop 428a causes the 360-degree video stream to re-orient each time handler 419 changes course or looks another direction, and moves the virtual center of the 360-degree ART video field with each handler step on the simulator treadmill or replicator stage.

Feedback loop 428a performs another vital function as well, "kick-starting" the entire process of follow-me instructions to a standing proxy robot, dorment in all its limbs and joints but actively transmitting video from the area immediately around its robotic feet all the way to the sight horizon of its 360-degree, high resolution far-field camera means. From this and other surveillance video from the remote site, terrain analysis computer 416 has placed the head-mounted display goggles of a human handler in an environment simulator or terrain replicator exactly where the proxy robot is in this initial, standing state, on a distant location like Mars, where follow-me data signals take an average of 12 minutes to arrive from Earth.

Somewhere in Mission Control, a decision is made to commence exploration in a particular direction, so a human handler 419 in a custom-fit, custom-marked full-body motion capture suit commences walking in that direction, stopping to observe a stone or scan the horizon with a look around. All of these body suit movements are captured by motion capture means 424, then directed to follow-me data computer 427 which commences generating a follow-me data signal train 428 that starts its 12 minute journey to proxy robot 403 at the remote mission environment on Mars. Meanwhile, feedback loop signal 428a keeps updating terrain analysis computer 416, which changes the center point and orientation of the ART video stream to follow the handler's every move. So while terrain analysis computer 416 generates updated 360-degree video fields as the handler 419 changes position, the ART video stream going to the handler's display means 418 is a view of the remote terrain from wherever the handler is looking. For the next 12 minutes, the handler in the motion capture body suit keeps walking and exploring the virtual surface of Mars, even while the proxy robot on the Red Planet remains motionless. Finally the first follow-me signals arrive, and the proxy robot begins to traverse the actual terrain on Mars that the proxy robot handler in the motion capture suit had traversed 12 minutes earlier; updated 360-degree video starts arriving at the terrain analysis computer 416 from Mars in another 12 minutes; and the mission continues until the proxy robot is placed in a resting state once more.

FIG. 1F is a more detailed description of the system above. In proxy robotics, the movements and positions of a human handler are translated into operating code understood by a bipedal humanoid robot. In the diagram, a proxy robot 512 is traversing the terrain 513 at a remote location such as the Moon or Mars with a digging tool 515 in hand, replicating every move of a human handler 501 on a treadmill local environment simulator 506, on Earth or at some other mission base, while holding a replica tool 508. Note that the incline of treadmill 506 matches the pitch of the terrain 513 immediately below and around the remote proxy robot.

The proxy robot receives data in the form of follow-me commands 525 streaming from follow-me computer 523. Motion capture video originates from sensors represented by cameras 504a-c that monitor the position and movements of the human handler 501, with their outputs aggregated by motion capture data aggregator 521. In its simplist form, aggregator 521 is a WiFi wireless local area network (WLAN) hotspot operating on the IEEE 802.11 protocol, forming a wireless community network among the motion-sensing cameras.

In the drawing, the human handler 501 is wearing a full body suit 502 custom marked for that particular handler with lines representing skeletal points, and circles, squares, arrows and other symbols representing hinges, hand and finger position, boot and head bearing and so forth. The body suit is black or a dark color, and the lines and symbols 503, 503a are all white or light colors. Motion captured video can easily reduce handler reproduction to a stick figure (FIG. 17A-G), making translation to follow-me data a relatively simple task. The signal train 522 produced by motion capture data aggregator 521 is fed into the follow-me data computer 523, which produces streaming follow-me data 525. It is also possible to feed separate video streams from each motion-sensing camera directly into computer 523. In either case, follow me data computer 523 analyzes all the motion sensor data in order to produce a follow-me data stream that accurately represents each movement and position change in the full body suit.

The data stream is further time-stamped by base timestamp clock 524, an extremely precise atomic clock synchronized on Earth to a twin clock 534 prior to sending the second clock 534 to the remote mission site. The resulting time-stamped follow-me data stream 525 is routed to base/handler communications means 526 for transmission over path 527 to remote site/proxy robot communications means 528. At the remote location, the follow-me data stream 529 is converted by follow-me data translator 530 into data code understood by the motor systems of the proxy robot, and ultimately into signals 531 directed to each electro-mechanical hinge and synthetic muscle 532 in the proxy robot to cause all the robot's hinges and muscles, partially represented by joints 514, to emulate the movements of the human handler 501 on Earth.

Here is a more detailed description of Earth base and remote extraterrestrial mission site communications means from a data flow perspective. When base-timestamped follow-me data 525 exits follow-me computer 523 it is routed to a modulator 552 in the transmitter section 551 of base/handler communications means 526. The modulator 552 enables outgoing information such as the follow-me data stream 525 to modulate an RF signal generated by RF section 553, and the resulting modulated RF signal is directed to a power RF section 554 for amplification. The amplified composite RF output 548 of power RF section 554 passes through multiplexer/demultiplexer 555 which permits modulated RF output signal 548 to be transmitted from high-gain antenna 556 while at the same time permitting modulated RF signals 549 lower by orders of magnitude to be received by the same high-gain antenna 556 without significant interference between the outgoing 548 and incoming 549 signals.

Transmissions outgoing from the Earth base/handler side, including the follow-me data stream 525 representing human handler movements, travel over path 527 until it is received by a similar high gain antenna 557 at the remote mission site. The received signals pass through a multiplexer/demultiplexer 558 at the remote mission site which serves to isolate what is now a low-level modulated RF signal 547 from much stronger transmissions 546 emanating from remote site/proxy robot communications means 528.

From multiplexer/demultiplexer 558 the received modulated RF 547 enters demodulator 561 in receiver section 560. Demodulator 561 separates the modulating information content from the RF, and the resulting data stream is passed to signal processor and deaggregator 562 wherein individual data streams are separated and processed as necessary.

One such data stream is the follow-me stream 525 generated by follow-me computer 523 back at the Earth base. This data stream is passed 529 to a follow-me data translator 530, the purpose of which is to translate the received follow-me data into code 531 readable by the hinges, motors and electrical muscles of proxy robot 512 (below). At the same time, video from at least two eye cameras 509 (right) and 510 (left) in the head of the proxy robot 512 is combined with 360-degree video from far-field camera 516, which is shown atop the head of proxy robot 512 and may constitute a single video camera which either rotates 360-degrees or with an optical system utilizing rotating prisms or mirrors. High resolution far-field camera 516 may also obtain its 360-degree view by pointing directly up or down (at right angles to the horizon) toward the tip of a 45-degree cone with reflective surface or into a hemispheric reflector or other curved mirror, or may consist of multiple cameras and lenses staged 360-degrees around the proxy robot. In the hemisphere reflector or curved mirror examples, any distortions introduced by the optics can be eliminated with either corrective lenses or by applying the proper software algorithm to the video thus produced, while the video from multiple cameras staged around the proxy robot can be stitched by software to form a 360-degree video field. Camera 516 can also be mounted on a gimbal stabilizer to compensate for movement and position changes by the proxy robot, and/or stabilized by solid state gyroscopic means.

Video from the proxy robot's near field eye cameras and high resolution 360-degree far field camera means is combined with other data from the proxy robot such as terrain-just-ahead data, power remaining and so forth, and sent 537 by wireless transceiver 511 to mission video and data aggregator 533. In its simplist form, aggregator 533 is a WiFi wireless local area network (WLAN) hotspot operating on the IEEE 802.11 protocol, forming a wireless community network including the transceiver 511 of proxy robot 512 and similar WiFi transceivers on all monitoring means such as monitoring means 517-519 depicted. Aggregator 533 combines the proxy robot video and data 537 with other data and video 535 from the mission site, as well as a remote site timestamp from timestamp clock 534, and sends the resulting data package 536 to modulator 563 in transmitter section 559 of remote site/proxy robot communication means 528. Modulator 563 imposes follow-me data and other intelligence on a radio frequency signal generated by remote site RF stage 564, and the resulting composite signal is amplified in power RF module 565 before passing through multiplexer/demultiplexer 558. The signals thus transmitted by transmitter section 559 of remote site communications means 528 exit through high-gain antenna 557 and over path 527 to high-gain antenna 556 on Earth, where they pass through multiplexer/demultiplexer 555 as low-level modulated RF signals 549 which are further routed through demodulator 567 in receiver section 566 of base/handler communications means 526. Signals 538 enter base side signal processor and deaggregator 568, one function of which is to provide meaningful data and video streaming in from the remote mission site to computer 540 (below).

Comparison of local 524 and remote 534 timestamps allows mission control computers such as 541 to precisely calculate path delays in each direction, an operation that becomes vital when dealing with long path delays such as three to twenty-four minutes in each direction to and from Mars, depending on the position of that planet in its solar orbit relative to Earth.

The signals 536 aggregated at the remote base are transmitted over a path 527; for example, a path between Mars and Earth, where they are received by base/handler communication means 526 and sent 538 to a computer 541 which serves to generate path and/or size compensated approximated real time (ART) video. Computer 541 is a terrain analysis computer, receiving video, positional and other data from the remote site as well as stored data 540 about the remote terrain in the active mission area.

Computer 541 can access information 539 regarding the size of proxy robot 512 relative to the size of human handler 501. From all data sources 538, 539 and 540, computer 541 generates an ART video stream 542 that feeds a video display such as a 3-D head mounted display 505 worn by human handler 501. The ART video stream 542 is not only a highly accurate representation of the terrain surrounding proxy robot 512, but also is scaled to put the human handler 501 in the "boots" of the proxy robot 512. Put another way, if the relative sizes of proxy and handler are 1:1, computer 541 would render the ART video stream 542 in normal size, but if the proxy 512 is twice the size (2:1) of handler 501, ART video 542 from computer 541 will be diminished to 50% (or 1:2), an inverse proportional relationship.

Conversely, if robot 512 is only half the size of handler 501, ART video 542 from computer 541 will be expanded to twice size (2:1). The end effect is to put human handler 501 in the "person" of proxy robot 512: seeing through the proxy's eye cameras and directing its every step via motion capture. The motion capture means depicted in FIG. 7 includes a plurality of motion capture cameras 504a-504c observing the human handler 501 from various angles. The video data from the motion capture cameras is directed 520 to a motion capture data aggregator 521 which in turn feeds pertinent motion information 522 to a follow-me computer 523 which translates handler motion information into a continuous stream of data 525 transmitted by human handler communication means 526 over path 527 and directed 529 from remote communication means 528 to a follow-me data translator 530 for interface 531 with various motors and hinges 532 in proxy robot 512 that enable the proxy robot 512 to follow and replicate each move of the human handler 501.

At the local base, a follow-me data sample 545 is sent back to computer 541, in a feedback loop that allows computer 541 to instantly compensate for movement, position changes and body movements like head-turning from handler 501, always giving the handler a precise proxy-robot-eye view of its location. Transceiver 507 relays signals from the human handler to base/handler communications means, to other handlers or mission personnel, and to other communications devices (not shown) at the local base.

Computer 541 also streams remote terrain data 543 to environment simulator computer 544 for processing in such manner as to drive 550 such electromechanical means as treadmill 506, or simulator and replicator means described in the pages to follow, including but not limited to piston terrain replicators, giant tilt tables, 3-D printed terrain replicators, or various omnidirectional treadmills.

Remote site reconnaissance and monitoring is represented by satellite 517, balloon 518 and Buoy Cam pole camera 519. In any body in space with sufficient gravity, one or more satellites 517 may orbit the mission site, either passing over at regular intervals or parked in synchronous orbit over the region of interest. Spacecraft may also surveil the area on passing or continue to orbit the planet. Likewise, balloons 518 may be deployed over extraterrestrial sites on planets like Mars which have at least some atmosphere, but not on places such as Earth's Moon which are devoid of atmosphere. A plurality of pole cameras with rugged video cameras mounted atop extending poles like the Buoy Cam 519 described in Stephens' co-pending application Ser. No. 14/594,128 and incorporated in full herein by reference, may be deployed over the entire mission area.

All of these devices have roles to play in a mission of space exploration. Initial reconnaissance can be done from both passing spacecraft and orbiting satellites, and include high resolution pictures and video of the area in question as well as topographic mapping and site surveys. This early reconnaissance aids in the selection of a particular mission site. Later, spacecraft and satellites can deploy one or more balloons for closer reconnaissance and ongoing surveillance, or "cluster-bomb" a quantity of Buoy Cams 519 as "eyes on the ground" capable of being moved and re-staged as the mission progresses.

Satellites 517 and balloons 518 can also serve as communications platforms, enhancing device-to-device communication at the remote mission site and serving as part of remote site/proxy robot communications means 528 as they relay data and video from the proxy robot 512 via its transceiver 511 or from Buoy Cams 519 and other data and video sources at the remote mission site.

FIG. 1G. If a 3-D printer terrain replicator 572 such as described in FIG. 6 below is utilized for the human handler, remote terrain data 543*a* from computer 541 can be sent to a terrain replicator computer 570 for translation into data 571 understandable to that replicator, enabling it to produce 573 a highly accurate rendering 574 of the remote mission terrain under and surrounding the proxy robot 512 (FIG. 1F). Data 571 can similarly be directed 575 to a piston 3-D terrain replicator as discussed in FIG. 1A-D above, producing the three-dimensional replica 577 of the remote terrain depicted in FIG. 1B. While the ART video stream 542 produced for viewing by the human handler is an absolute requirement of environment simulators utilizing treadmills of various varieties, the need is less stringent for environment replicator systems producing physical "holodeck" replications of the actual remote terrain.

Activity Flow Chart. From the descriptive matter above we can make a flow chart of a way to explore a remote environment such as a location on the surface of the Moon or Mars (remote environment) from a local base on Earth (local base) by proxy robotic means by:
1. placing an upright proxy robot at a predetermined location in the remote environment;
2. deploying additional surveillance means on the surface of and above the remote environment to capture images and data pertaining to that environment;
3. activating a near field and a high resolution 360-degree far field video camera on the proxy robot (PR cameras);
4. capturing video of the remote environment from a terrain immediately surrounding the proxy robot to a sight horizon of the PR cameras;
5. aggregating the video from the PR cameras with the images and data from the additional surveillance means;
6. transmitting the aggregated video and data signals over a path to the local base;
7. directing the aggregated video and data signals to a terrain analysis computer at the local base;
8. generating by the terrain analysis computer a 360-degree approximated real time (ART) video field precisely representing the terrain surrounding the proxy robot at the remote environment;
9. directing video from the 360-degree ART video field to a display means in a simulator/replicator at the local base;
10. providing the simulator/replicator with a full body motion capture suit (MC body suit) marked to the dimensions of a user, wherein activities performed virtually in the 360-degree ART video field of the display means in the simulator/replicator represent the same activities to be performed by the proxy robot in the terrain of the remote environment;
11. capturing by a plurality of motion-sensing video cameras video signals reprenting every move or position change in the MC body suit;
12. directing the video signals from the motion-sensing video cameras to a follow-me data computer to produce follow-me data signals;
13. transmitting the follow-me data signals to the remote environment;
14. directing the follow-me data signals back to the terrain analysis computer for continuous updating of the 360-degree ART video for the display reflecting each position change from the MC body suit;
15. translating the follow-me data signals by a follow-me data translator at the remote environment into data code addressable to each electro-mechanical hinge, motor and synthetic muscle in the proxy robot;
16. causing the proxy robot to move through the remote environment by emulating every move and position change in the MC body suit at the local base;
17. receiving 360-degree video from each new position of the proxy robot; and
18. transmitting continuous follow-me data signals from the local base to the proxy robot in the remote environment.

Referring to FIG. 2A, a proxy robot surrogate 301 is depicted as well as its human handler 302. Note that the body position of both handler and proxy robot is the same, with the proxy following all the handler's moves. For example, in the handler's right hand 305 is a bar tool 306 for breaking and prying rocks; but more correctly the handler is holding a replica bar tool, probably made from plastic, composite or wood to simulate the weight of such a tool on the moon or at some other location in space. This and other replica mission tools would be stored in an area of easy access.

Proxy robot 301 is also holding a bar tool 304 in its right hand 303, but in this case the tool is real, made from steel or a similar substance capable of performing real work. Note as well that the robot is being made to walk up a slight hill 307, the incline of which is duplicated by mechanisms controlling a treadmill 308, which in this figure and those to come may, in an exemplary embodiment, be a manual treadmill controlled by the human handler's feet. Alternatively, the controlling mechanism is a motorized treadmill that automatically re-centers the handler after each step. Such control of handler pitch, roll and heading will be covered in the discussion under the figures to come.

Pitch and other positional aspects of handler's treadmill 308 are continually adjusted in the handler environment from computer-driven mechanisms analyzing video and other signals from the proxy robot. For example, satellite triangulation can have sufficient resolution to indicate an average terrain rise of so many centimeters per meter; moreover, Doppler radar transceivers operating via radio frequency, light, infra-red or even sonar where applicable can be located in appropriate locations 326, 327 such as above the robot's eye cameras and in the front of the robot's boots, respectively.

Some data, such as that just discussed, flows from proxy robot location to human base. Just as vital is data flowing from handler to proxy robot. For example, joints 310 in the arm and wrist of human handler 302 continually send positional and joint angle data to the robot for "follow me" replication by the proxy. Similar data is sent from hand and finger joints 312 in the human handler for replication in the same joints or hinges 311 in the robot. Torso and leg angles in the human 314 are also sent as data to the proxy for replication 313, and joint angles in the feet of the handler 316 are translated into data for replication in the proxy 315.

There are a number of means by which joint angle and similar data can be monitored and sent. One means is via clothing with built-in strain gauges at critical joints; another is from similar strain gauges in special elastic bands fitted for wear on the knees, ankles, elbows and so forth, as discussed under FIG. 17. Gloves, stockings and "booties" can also contain strain gauges. Another approach involves gyroscopic position marking, especially of the head's various angles. While only one side of human and proxy are depicted, is to be appreciated that similar data emanates from the right arm and leg of the human to control those sections of the proxy as well.

Depending on the need of the mission and complexity of the proxy robot, data can be sent from many more points on the human for replication by the proxy. Vital sensors would continuously monitor the side-to-side angle (yaw or heading), up-down angle (pitch), and sideways tilt (roll) of the human's head, represented by point 318 in the drawing. All of these angles will be faithfully replicated by the proxy robot, as represented by point 317. This latter interchange of data is extremely important, since it duplicates the human function of scanning, analyzing and "looking around."

Another method of sending "follow me" movement and positional data from handler to proxy is discussed in various figures below and in U.S. Patent Application 61/613,935; namely, the use of motion capture technology to monitor the same critical joint and movement areas by camera or other means. Depicted in the drawings are three appropriately modified motion capture cameras 337-339 spaced at 120-degree angles around the handler to capture the handler's every move. Data from these cameras is sent to a computer for analysis which is translated to near-real time movement commands to the proxy robot.

There are approximately 230 joints in the human body, but a number far fewer than this can suffice for robots and their human handlers. Wherever the robot is stiff and inflexible, the human will feel the same inflexibility in this exemplary embodiment, as noted by rigid areas 319 on the arm and torso of the proxy and the same areas 320 on the handler. Area 321 on the human handler comprises a display of video from the camera "eyes" 328 of the proxy robot. Other important data can be displayed on the handler's goggles as well, the subject of the figure to follow.

A two-way communication headset worn by the handler includes headphones 322 and microphone 329, and provides a means of handler communication with human colleagues, including mission personnel and other team members. The handler's microphone 329 can also be used for voice commands not directly intended for the proxy robot. A prime example of the latter is a command to take the handler off-line: for a change of handlers, a coffee or bathroom break, a quick meal or other purposes. So the handler might say "Freeze, Freeze" to stop the robot in its tracks and go offline, and "Restore, Restore" to restore the link and continue human-robot interaction.

FIG. 2A also depicts the headset's electronic circuit. Headphones 322a connect to a buss line 336 accessible to other handler team members and mission personnel. Microphone 329a feeds two buffer amplifiers 334. The amplifier to the right connects handler voice communication to the mission buss 336, while the left amplifier connects to processing circuitry that translates voice commands like "Freeze, Freeze" into meaningful guidance signals for the proxy robot. In this embodiment, a proxy robot can only receive signals from her/his handler; other communication on the mission buss is not received. Alternatively, two microphones at position 329a could be employed; one to direct handler voice messages to the mission buss, and another to direct voice commands to the proxy robot.

A "gravity harness" 323 complete with protruding portions 324 to allow maximum handler flexibility is connected to a number of bungee cords 325 (or cables with springs) calculated to render the weight of the human handler the same as that of the handler's proxy robot at its remote location.

For example, earth's moon has approximately ⅙ earth gravity, so if a particular proxy robot weighs 120 kilograms on earth it would weigh a mere 20 kg on the moon. So the object is to render the weight equivalent of the human handler that same 20 kg, regardless of his or her actual weight. Put another way, if the handler weighs 70 kg, the gravity harness would effectively reduce that weight to 20 kg if that is the weight of the proxy on the moon.

Figure 2B:
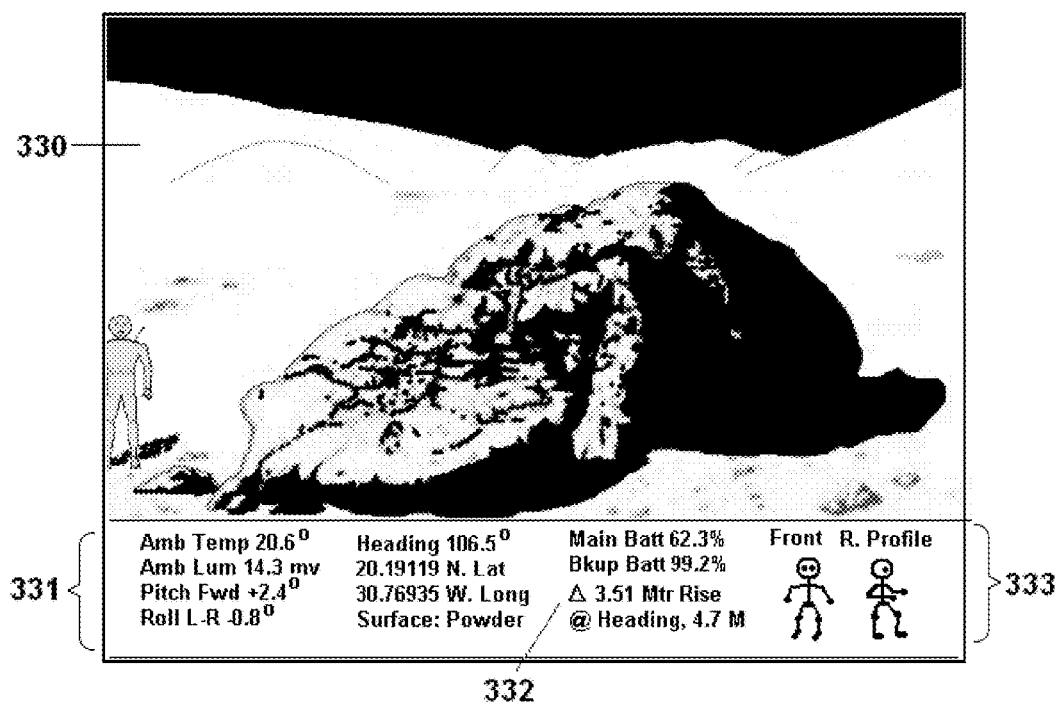
FIG. 2B illustrates an exemplary embodiment of a representation of a heads-up display.

FIG. 2B is an exemplary representation of how a heads-up display can appear in the helmet or goggles of a human handler, or on viewing screen(s) in front or possibly surrounding that handler. The upper portion 330 of the screen in the drawing shows real- or near-real-time video from the eye cameras of the handler's proxy robot: a lunar scene with hills in the background and a large rock in the near foreground being surveyed by another proxy robot.

In an exemplary embodiment, as this video would almost certainly be three-dimensional, the handler's goggles include such provision for 3-D rendering as polarization, left-right switching, color differentiation, vertical striation or some other known way to channel video from the robot's right camera to the handler's right eye and left camera robot video to the left eye of the handler.

The display screen also includes such important information from the remote location as ambient temperature, ambient luminosity, pitch forward (incline in this case), roll right-left (slight tilt to the right showing), heading in degrees from true north, latitude and longitude, surface conditions, and proxy battery status, all represented by 331 in the drawing.

Area 332 of the display contains alerts and warnings, in this case a message about an abrupt 3.51 meter rise (the big rock) some 4.7 meters ahead of the proxy, while area 333 of the screen depicts a frontal and right profile view of the proxy robot's body in simple outline or stick figure form. The latter could be vital in depicting a proxy robot fall or entanglement.

FIGS. 3A-C illustrate an exemplary method and apparatus whereby the handler can change heading on the treadmill, causing the robot to change heading while the human handler stays safely on the treadmill. This can be accomplished by placing the treadmill on a turntable.

In FIG. 3A, the handler steps from position 44-45 by moving her left foot 44 to a turn position 47 pointing to a change in heading 48 to a new bearing 42 which is forty-five degrees clockwise of the old position. When the handler moves her right foot from position 49 to 50 in FIG. 3B (with the left foot remaining at position 51), this action completes the forty-five degree bearing change and causes the turntable to rotate from the old heading 52 to the new heading forty-five degrees right (clockwise) 53.

In FIG. 3C we see an exemplary embodiment of treadmill 54 at the new heading 55, and also that the treadmill has moved the handler back to the center. What is less obvious is that the handler has also shifted the positions of her feet 57, 58 to once again face forward, a move that can take place with a temporary offline interval like the "Freeze, Freeze" voice command discussed in FIG. 1 above. Small corrections like this should become second nature to the handler with adequate training.

FIG. 4 shows an example of how the orientation of turntable 40 in FIG. 3A can be changed to follow the footsteps of the human handler. In FIG. 4A, the handler's left foot 59 has already moved to the new orientation. Next the handler moves her right foot from position 60 to 61, aligning both boots in the new heading. FIG. 4B shows a magnified and more detailed top-down view of the right boot 64, showing two marker points 65 and 66 along the front-facing axis of the boot. The left boot (not shown) would have points at corresponding locations.

In FIG. 4C, an overhead reader 68 scans or otherwise notes the position of these markers atop the handler's boots, including markings 65a and 66a on the right boot 64a as shown. When the second boot (the right one in this example) has changed heading, reader 68 sends a command to the turntable (40 in FIG. 3A) to rotate to a new heading averaged between the heading readings from both boots.

In practical terms there are many ways that reader 68 can track the points on the handler's boots. One possibility is by radio transmission (RFID, Bluetooth, WiFi, Zigbee, near-field or any number of other RF means), wherein the reader contains transceivers that "ping" both points on each boot and triangulate their relative locations. Other triangulation methods can include laser transmission and reflection, radar and sonar. Or the points on the boots might themselves be transmitters of RF, sound or light, in which case the reader would incorporate one or more receivers to plot the orientation of each boot.

Still under FIG. 4C, the areas 69 under the heel and sole of each of the handler's boots denote pressure switches to signal "foot down" to the proxy robot. This is an important operation, since it may be difficult for the handler to know whether a proxy's "foot" is firmly down or still hanging an inch off the ground, creating an impossible situation for the robot when the handler moves the other foot.

So the purpose of each pressure switch 69 is to tell the proxy robot that the heel, sole or both portions of the handler's boot is firmly on the ground, at which point the proxy will follow suit. Having pressure switches 69 under each portion also guides the proxy in the navigation of rough terrain, steep angles and so forth.

While FIGS. 3 and 4 above demonstrated a method and apparatus for varying the heading of a human handler on a treadmill, FIGS. 5-7 will demonstrate method and apparatus for varying the pitch 78 (tilt front-to-back) and/or roll 82 (tilt side-to-side) of the treadmill.

FIG. 5 depicts an exemplary embodiment of treadmill 70 mounted to a stand 71 with appropriate mounting hardware 72. Attached underneath the stand are four legs 73-76 extendable via hydraulic, pneumatic or other means from a relatively flat profile 77 to many times that height 73. When all legs are in their compacted state, the plane of stand 71 and its treadmill 70 is flat, without tilt in any direction.

Let us first consider pitch. If we want to tilt the treadmill up from front to back 80, front legs 74 and 75 should be in their compressed state, while back legs 73 and 76 will be totally or partially extended to achieve the desired rise to the rear of the treadmill. Front-up, rear-down pitch 81 is achieved by doing the opposite: extend front legs 74 and 75 and compress back legs 73 and 76.

In the case of roll, we can tilt (roll) the treadmill downward toward the right side 84 by compressing legs 75 and 76 while extending legs 73 and 74, or conversely tilt downward toward the left side 85 by compressing legs 73 and 74 while extending legs 75 and 76.

The accurate simulation of some remote terrain might involve a degree of both pitch and roll: for example, as the proxy robot climbs an irregular incline. Simulating this condition might involve fully compressing left rear leg 73, fully extending right front leg 75, and partially extending legs 74 and 76—all in accordance with terrain data received from video and sensors on the proxy robot.

FIG. 6 illustrates another exemplary method and apparatus for adding pitch and roll as taught in FIG. 5 above to a treadmill 86 mounted by suitable means 87 to a stand 88 which rests on four or more short legs 89. Each leg in turn rests on a ball joint 91 and ball-cupped foot 90 which may be mounted to the floor.

In this figure, pitch and roll are controlled by four winches 97-100, each connected to a cable, wire or rope 93-96, and one or more corners of the treadmill stand 88 are lifted to achieve the appropriate amount of pitch and/or roll. For example, if the incline of the terrain depicted in FIG. 1 above defines a rise (pitch) of 9 degrees, the treadmill might need to rise 10 cm from back to front, meaning that each of the two forward winches 97 and 98 would be commanded to take in 10 cm of cable.

In the example above, the treadmill would rest solely on its two rear legs, but the angle of each leg would no longer be perpendicular to the floor. This is the reason for ball joints 91, allowing the some weight of the treadmill and stand to rest on the rear legs even as their angle changes relative to the floor.

Always having at least one and usually at least two feet on the floor will help secure the semi-hanging treadmill, stand and human controller, but there are at least two additional means to further stabilize the device. The first is to have telescoping elements 92 in each short leg to allow all legs to continue to touch the floor under any combination of pitch and roll. These are not the hydraulic or pneumatic jacks of FIG. 5, but rather serve only to stabilize the platform against sway. Rather than strictly telescoping, the internal extension 92 may also be made of spring steel, gently pulling the stand down under small extension and exerting increasing counter-force with greater extension.

A second method of platform stabilization is depicted in the form of lines 115-118 radiating outward from each corner of the stand 88. These lines are connected to a suitable hook 119, and may represent bungee cords or ropes or cables with series springs to maintain the entire platform centered and stable under various conditions of pitch and/or roll.

FIG. 7 illustrates still another exemplary method and apparatus for the addition of pitch and roll to a treadmill simulator for human proxy robot handlers, wherein the legs 120 under a treadmill 108 are firmly mounted to the floor of a modified or custom made motion simulator 101. Motion simulators are typically costly devices, with pitch, roll and various vibratory sensations (like earthquakes, rocket engines or runaway trains) are created by varying the length of four or more large hydraulically extending arms 102-105 resting on large floor pads 106, 107.

Within the pod of motion simulator 101 we see the human handler 302 of FIG. 2A, complete with gravity harness 109 and bungee cords or cables with series springs 110 hanging on hooks 111 from the ceiling of the pod. Note however, that this environment allows the human handler to view video from the camera "eyes" of her proxy robot on a large and possibly wrap-around video screen or screens 112 rather than view the same video in a helmet or goggles.

If goggles 113 are worn by the handler, the principal reason would be for 3-D viewing, while a two-way headset 114 may still be employed for mission and team communication as well as voice commands like "Freeze, Freeze." Although the same ends may be accomplished via a microphone and speakers not directly connected to the person of the handler, the headset 114 serves the additional purpose of isolating the handler from ambient noise including operational sounds of the motion simulator.

FIG. 8 illustrates an example of a spherical treadmill with variable pitch, roll and infinitely variable heading. In this novel approach, the treadmill takes the form of a large sphere 130, with a diameter many times average human height; e.g., at least three times but preferably five or more times human height. The diameter of sphere 130 in FIG. 8 is approximately 30 feet, but the simulator staging area typically occupies only the top 25% to 35%, as depicted by floor line 140. The sphere protrudes from a circular opening in upper floor 140, and a small area 168 where floor meets sphere is magnified to depict Teflon® or a flexible, renewable material such as bristles, rubber or plastic between the two surfaces. In addition to keeping debris from falling through the floor, this junction 169 serves to stabilize the sphere and smooth its motion.

The sphere 130 can be made of a lightweight but strong material such as plastic, aluminum or composite coated with rubber or a similar no-slip substance. It rests upon three or more large bearings 134, with each bearing seated in a socket 134a which is mounted firmly in place to the support floor under sphere 130. Bearings 134 and their lubricated sockets 134a assure movement of the sphere with minimum friction, allowing pressure wheel motors 131 and 133 to be relatively small and economical.

In the upper (simulator stage) portion of the sphere 130, a human handler 135 is taking a step to direct her proxy robot's course. As this takes place, data indicating handler heading 141, step distance 142 and step moment (time duration and velocity) 143 is sent to handler step motion circuitry 136 which sends appropriate data representing each parameter to both the proxy robot as part of a "follow me" data string 139 and to a processor 137 that feeds either digital or analog data to motor control circuitry 138a, 138b and 159, with description to follow later.

If the proxy robot is walking on flat terrain, the human handler will occupy position 135a at the very top, center of sphere 130. Although that handler will be atop a very slight rise equal to the rise atop that section of the sphere, the simulation from a sphere five times the human's height will be of a relatively flat surface.

But if the robot is walking up a rise akin to the example in FIG. 1, this positive (nose up) pitch of around 10 degrees can be simulated by situating the handler in position 135b on the sphere. A more severe forward pitch of approximately 20 degrees is shown as position 135c on the sphere, while at position 135d near floor level, rise in pitch approaches 45 degrees. Positive (upward) pitch is represented by arrow 144 in the drawing, while downward or negative pitch is represented by arrow 145.

Downward pitches on the same heading at −10, −20 and −45 degrees can be simulated from positions to the left of the sphere, at 135e, 135f and 135g, respectively. If the handler's position moves left in the direction of arrow 146, there will be leftward roll (left tilt) in that position. For example, position 135h would exhibit severe roll, tilting some 25 degrees to the left. Moving the operating stage in the opposite direction (hidden from view) will result in roll to the right (right tilt). From the foregoing, it can be seen that any conceivable combination of pitch and roll can be found at various locations on the surface of the spherical treadmill 130.

Since the pitch and roll conditions in the simulator beneath the human controller are determined by feedback 152 from the proxy robot's remote location, suitable means must be present to change the location of the handler staging area to one matching the average pitch and roll of the remote terrain. In the drawing, data is received from at least three sources on the body of the proxy robot: 3-D video from its eye cameras 153, terrain-level radar data from its boots 157, and an additional radar view 158 from a point above the robot's video cameras.

The video feed from the remote location is routed directly to display devices for the human handler and other mission personnel. Video can also go to a video terrain analyzer 153 which turns the near-real-time video stream into data 156 about the terrain ahead, both immediate (next step) and the general lay of the land upcoming.

These three data streams—video analysis 156, boot view radar 157a and "third eye" radar 158a are routed to a terrain-just-ahead data circuit 154 where they are bundled with data from handler step motion data circuit 136 and fed to a processor 137 which turns all the input into meaningful signals to drive the above-mentioned motor control circuitry 138a, 138b and 159.

Motor control circuits 138a and 138b convert the data from processor 137 into positive or negative direct current to drive motors 131 and 133 and their respective pressure rollers 131a and 133a in either direction when so instructed by processor 137, causing the sphere to turn under the handler's feet to compensate for steps the handler takes forward, backward or in any direction whatever. But since it is also acting from signals representing such upcoming terrain conditions as pitch 144, 145 and roll 146, it is the function of the roller motors to effectively move the sphere under the handler as each step is taken to place that person in average pitch and roll conditions matching the remote terrain to the greatest extent possible.

Motor mounts 132 are illustrated to show a possible position for a pressure solenoid that can activate whenever a roller motor is called into service, pushing, for example motor 131 and its attendant roller 131a harder into the sphere to gain traction. The advantage of using solenoids in this manner is that the non-active roller(s)—from motor 133 and its roller 133a in the example—provides less drag for the active motor and roller to overcome. Of course there may be instances when both roller motors (or possibly four roller motors, one every 90-degrees, with roller motor pairs spaced 180 degrees apart) may be called into action simultaneously. But in this case there will be less drag to overcome as motion overcomes inertia, even with all solenoids pushing the motors' rollers into the sphere. Although roller motors 131 and 133 are depicted as mounted against the upper floor 140, they can also be mounted at the sphere's equator or in any other convenient position.

As described in previous drawings, the human handler would be strapped into a gravity harness suspended from a platform 148, 149 by a number of bungee cords or cables with springs 147. A rotation collar 149*b* allows the platform to rotate freely in any direction. As the handler is effectively moved about on the staging surface of the upper sphere, it is important that the gravity harness follow those movements to maintain the handler's correct effective weight, by lifting from a position directly above the handler and harness. In the drawing, three handler positions are depicted: 135*a* which is relatively flat, 135*b* with a positive pitch 10 degrees, and 135*c* with a forward incline of some 20 degrees.

Roller motors 131 and 133 can place the handler in any of the above positions or virtually anywhere else on the simulator stage, but an additional mechanism is needed to move the gravity harness as the handler is moved. This mechanism is an extendable boom or robotic arm 162 shown at the top of FIG. 8, which provides overhead lift as well as positional correctness directly over whatever handler's position. The boom or robotic arm depicted is for illustrative purposes only, as it can be appreciated that other combinations of tracks, motors and cables can place the handler at the required positions.

At the tip of the boom is a winch 161. The motorized winch maintains constant torque (upward pull) on the handler at some predetermined level. For example, if the handler is to match the 40 lb. lunar weight of a 240 lb. robot, that handler's weight should be effectively 40 lbs. So a 160 lb. human handler would require a constant upward pull of 120 lbs., and a downward pull by gravity of 40 lbs. It is the job of winch 161 to maintain this effective weight. The winch pays out as much cable 150 as necessary to constantly maintain the desired upward pull on the handler, and it receives data from processor 137 via boom motor control circuit 159. The cable positions 150, 150*a* and 150*b* are maintained directly over handler positions 135*a*, 135*b* and 135*c*, respectively, by lateral movement of the boom, which can extend/retract; swing right or left, and tilt up or down in accordance with data instructions from processor 137 and boom motor control 159.

Maintaining constant torque solves one problem; namely, that the length of cable 150 must change the further the handler is moved from the "flat" position 135*a* at top center. So when processor 137 and roller motors 131, 133 act to place the handler in position 135*c*, for example, the length of cable 150 would appear to leave the handler dangling in mid-air. But since such dangling weight would equal 160 lbs downward, the constant torque mechanism would immediately command the winch to let out more cable until the handler once again exerts 40 lbs downward and 120 lbs upward.

The winch weight-reducing apparatus is only necessary in remote locations with far less gravity than earth, a situation particularly true on the moon. For earth-bound projects, for example, the handler harness would require no gravity compensating apparatus, nor would it be useful on planets with greater gravity than earth.

FIG. 9 illustrates another approach to the rotation of sphere 130. Items numbered between 130 and 165 remain as described in FIG. 8 above, while FIG. 9 is concerned with a plurality of motors with rollers equally spaced around the sphere, preferably at its equator 281. In this drawing, twenty-four such roller motors are spaced at fifteen degree intervals around the sphere, with nos. 251-263, representing the 13 roller motors visible in the hemisphere facing outward in the figure, and 264 representing the 11 roller motors out of view. In fact, any number of roller motors can be employed, with greater roller motor numbers spaced proportionately closer yielding finer control over the movement of the sphere 130. For example, thirty-six roller motors can be spaced at ten degree intervals, with opposing roller motors (at 180-degree spacing) receiving positive or negative direct current such that one exemplary motor such as 251 in the drawing will turn in the opposite direction of its opposing counterpart 263.

Simply activating opposing roller motor pairs with motors spaced at ten degree intervals would permit the same ten degree resolution of movement by the sphere, but the ability to activate two neighboring motors such as 257, 258 when necessary as well as their counterparts on the other side of the sphere can reduce that resolution to five degrees of accuracy. But in point of fact, extremely fine resolution of movement, on the order of one degree or less, can be achieved through the application of more torque voltage on a motor such as 257 and less on its neighbor 258 as well as their opposing counterparts.

In FIG. 9, the motor control circuits 138*a* and 138*b* of FIG. 8 are replaced with a motor array controller 250 which translates data from processor 137 into analog currents of specific polarity and amplitude to move spherical treadmill 130 in any desired direction under a human handler.

Motor and roller assembly 251 is shown in blowup form in insert 251*a*, wherein motor 266 is attached to roller 267, and the roller motor assembly itself is attached to a motor mount 268 attached to sphere 130. The motor mount includes a swivel 268*a* and spring 269 that pulls the roller motor assembly away from the surface 282 of the sphere, creating a gap 273 whenever the roller motor is not in use. This swivel and spring combination assures that inactive rollers are kept off of the surface of the sphere so that they don't add unwanted friction that impedes sphere rotation. Swivel 268*a* and spring 269 are exemplary only, representative of a family of devices that can be employed for the stated purpose.

Also shown in insert 251*a* is a push solenoid 270 mounted 280 to sphere 130. The solenoid has an inner plunger 271 such as an iron rod that can be repelled or attracted by a magnetic coil in the solenoid. In this insert, the solenoid is not activated and the plunger is withdrawn nearly completely into the solenoid core.

Insert 265 illustrates a mode wherein the roller motor assembly is activated such that the roller comes into pressure contact with the surface 283 of sphere 130. This is shown in blowup form in insert 265*a*, where roller 274 is pressed against sphere surface 283 by energized solenoid 278 mounted 280 to the sphere. Note that plunger 279 is now extended from the solenoid core by magnetic repulsion, causing the motor mount 276 to rotate inward (counter clockwise) on its swivel 276*a*, stretching spring 277. In this active mode, positive or negative current applied to motor 274 by motor array controller 250 will cause the motor to turn in one direction, rotating the pressure roller 275 in the same direction, and causing sphere 130 to turn in the opposite direction.

FIG. 10 illustrates an exemplary method and apparatus for the adjustment of key proxy robot dimensions by means of turnbuckle-like bolts with opposing threads. Specifically, dimensions are increased or decreased by use of either electric motors 191-195 or a manually-adjusting element such as wrench-adjusted portion 205 in FIG. 10A.

For example, if positive DC current is applied to motor 191 in the torso of the pictured proxy robot, the motor will commence rotation, turning its two oppositely-threaded shafts 196 and 1997 in a counter-clockwise (CCW) direction (see threaded portions 201 and 202 in FIG. 10 for clarity). This CCW rotation will cause shafts 196 and 197 to screw into threaded tubes 198 and 199, diminishing the torso length of the proxy robot.

Conversely, applying negative DC current to motor 191 will cause clockwise (CW) rotation of the oppositely-treaded shafts 196 and 197, causing these shafts to exit each treaded tube 198-199 and extend the dimensions of the torso.

The same applies to all other motors 192-195 and their corresponding shafts 196-197 with opposing threads and threaded tubes 198 and 199, but in the case of all other adjustable sections, normal operation would be to adjust right and left halves in pairs. For this reason there are two motors 192 in the upper arms with shafts and threaded tubes; two motors 193, et al in lower arms; two motors 194 et al in upper legs and two motors 195 in lower leg sections. In the drawing, darkened areas at the joints 190, shoulders and hips simply indicate structural connection points to complete the robotic skeleton.

Thus it can be seen that positive or negative DC current may be applied to either torso motor 191 or any of the arm or leg pairs, not only to adjust the overall height of the proxy robot from a minimum of around 5 feet to a maximum of 6.5 feet or greater, but also to adjust body proportions to match those of a human handler with, for example, long legs and short torso; long arms and legs and average torso, or long torso and shorter legs—combinations that real people bring to each mission. More will appear on this subject under FIG. 10B below.

Power-assisted proxy robot adjustment means like those described above might enable programmed readjustment of robot dimensions with each change of handler. For example, five handlers might be continuously operating a single robot in shifts, twenty-four hours per day, seven days a week (earth time). At each shift change, the new handler could enter a code or swipe a card (etc) which would not only serve as a security pass but also feed that particular handler's human dimensions into a program that would automatically readjust the robot to the dimensions of the new handler. The closer the physical match between handler and robot, the simpler and safer it movement and productive operation, and the more the handler will feel "at home" in the body of her/his robotic partner.

Of course, manual dimension adjustments can be made to a proxy robot with motorized or otherwise powered controls as well, not only to override or circumvent programmed adjustment but also for testing or field adjustments for whatever reason. In one example of the latter, particular conditions in a mine or crater, say, might need the services of a "taller" robot, while work in a confined space might warrant minimizing all dimensions.

FIG. 10A, as discussed above, is partly included to show a magnified turnbuckle-like element for clarity. But it also stands alone as an alternative to automatic and/or machine-adjustable dimensional elements, with a center element 205 integral to a threaded shaft with opposing threads 201 and 202. Although the figure shows a turnbuckle or screw extender-style apparatus with threads in two elements 206 and 207 matching each threaded shaft at the center end of two open "C" support braces 203 and 204, a more likely scenario is that of internally-threaded tubes like those in FIG. 10 rather than support braces and threaded end elements.

To extend the apparatus of FIG. 10A, a wrench or similar tool is placed over fixed center element 205. As above, CCW rotation will cause shafts 201 and 202 to screw into internally-threaded elements 206 and 207, diminishing the overall length 208 of the mechanism, while manual CW rotation will causing the threaded shafts to exit each end element 206 and 207, extend overall length 208.

Figure 10B:
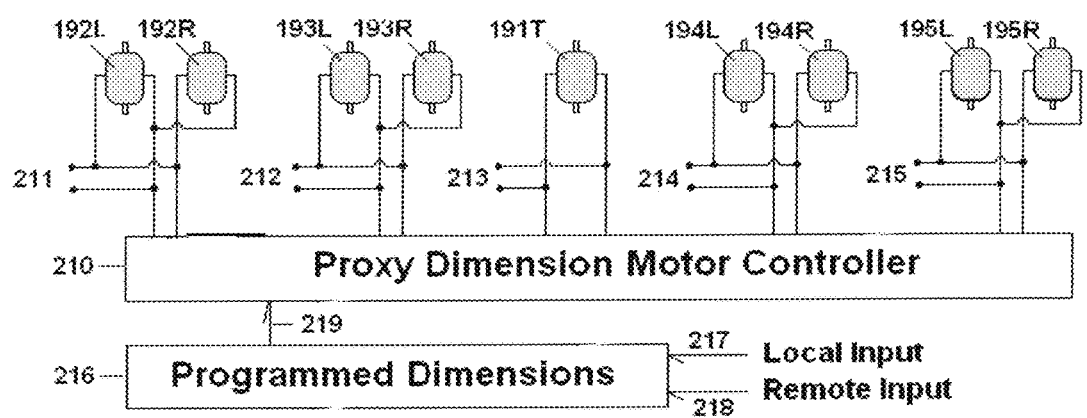
FIG. 10B illustrates an exemplary embodiment in block diagram form, of how the proxy robot dimension motors might work in a circuit.

FIG. 10B shows, in block diagram form, how the proxy robot dimension motors can work in a circuit. The motors represent upper arm portion 192 (left, right); lower arm section 193 (L,R); torso 191T; upper legs 194 (L,R); and lower leg sections 195 left and right. Note that all left, right motors are paired (wired in parallel), such that any adjustment to one lower arm, for example, would normally make the same adjustment in the other as well.

The two sides of each motor coil are directed to a proxy dimension motor controller 210, which in turn receives data 219 representing programmed dimensions 216 which can be either entered locally 217 at the site of the proxy robot, whether in factory, home base or some remote location, or, more likely, as remote input 218 within the communication data stream from the mission base.

Note as well direct inputs 211-215 to each motor or pair. This allows dimension changing by the application of appropriate positive or negative DC current directly into the robot—for testing, emergency situations, work-arounds and so forth.

FIG. 10C illustrates "taller" and "shorter" versions of a proxy robot, adjusted to match a taller and shorter human handler in each instance. Specifically depicted is a six-foot, six-inch human handler 220, and a proxy robot 221 adjusted to match the handler's overall height, arm and leg length, and so forth in accordance with the drawing and description under FIG. 10 above.

To the right of the taller human-proxy robot pair is another, shorter human handler 222 of five foot height, matched by proxy robot 223 of that same height. While it is obvious that humans 220 and 222 are not the same individual, the same cannot be said of robots 221 and 223, which represent the same proxy robot adjusted electronically to match the heights and other dimensions of the two distinct human handlers.

Note that the proxy robot's outer skin 224, 225 remains smooth and intact over the surface of the robotic frame. This outer skin renders the robot's internal circuits, power supplies and mechanisms clean and free from contaminates like dust and liquids, made possible through the use of an elastic, pleated or otherwise stretchable proxy robot skin constructed of plastic, rubber or some other flexible material.

Note as well compartments 226-229 in the larger proxy robot iteration 221. These contain electronics, mechanics, batteries, etc, and are mounted with vertical space between pairs 226-228 and 227-229. But in shrunken proxy robot iteration 223, the extra vertical space between the same compartment pairs 226a-228a and 227a-229a has nearly disappeared.

The principals discussed under FIG. 10C are for illustration purposes only, and apply equally to other dimension adjustment means such as hydraulic, pneumatic, screw-motor, turnbuckle, etc, while the illustration of compartments is also exemplary and not limiting in any manner.

FIG. 11 represents at least three scenarios wherein a proxy robot's dimensions (and quite possibly its movements as well) are controlled by fluid dynamics, including hydraulics and pneumatics. The first scenario involves hydraulics, with a hydraulic fluid reservoir tank 241 connected to a pump 230 that turns on as necessary to maintain some pressure constant in the tank and hydraulic systems. Although pump 230 is depicted in a position between tank 241 and hydraulic tubing 240 that runs throughout the robot, the actual location of the pump may vary.

Typically pump 230 is electrical; nevertheless, in dealing with proxy robots, whether semi-autonomous or under direct human handler control, it is possible to consider employing a manual pump that can be operated by either another proxy robot or even the subject proxy robot itself: when it begins to act "tired" it is directed to pump a plunger, squeeze a fluid-filled ball or a similar action to revitalize itself! Considerations such as this make it possible to envision robots operating completely from compressed fluid, with perhaps a single electric pump or even no electric compressor pump at all, with the robot receiving a full pressure charge periodically from a station at its mission base.

Still under scenario one, pressurized hydraulic fluid is available to a series of pressure valves 231-235 which take on the functions of the dimension-changing screw motors presented under FIG. 10. In the present case, each valve operates two pistons 238, 239 which protrude from cylinders 236-237 to change the overall dimension of their particular strut either positively (more length) or negatively (less length) depending on the hydraulic pressure let through each valve. Obviously, each hydraulic strut could operate with a single piston and cylinder rather that the double-ended configuration depicted.

The second scenario is also hydraulic, but in this case tank 241 serves to simply provide extra hydraulic fluid, and what were pressure valves 231-235 become individual pumps that each generate pressure sufficient to maintain a required set of strut dimensions. In this scenario, tank pump 230 simply assures sufficient fluid supply to each individual strut pump.

Scenario three works basically like scenario one, but in this case compressed gas replaces the hydraulic fluid. So pressure pump 230 is a gas compressor that maintains the gas in tank 241 at a constant pressure, and pressure valves 231-235, pistons 238-239 and cylinders 236-237 are all pneumatic rather than hydraulic. Although robot mobility is not the focus of the present discussion, it is to be understood that systems for robot motion can also be hydraulic or pneumatic in nature as well as operating from electric motors so some combination of the above.

Figure 11A:
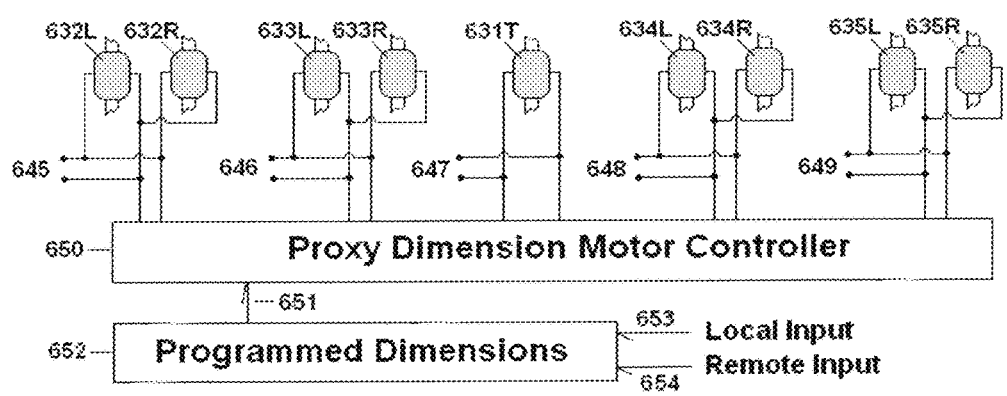
FIG. 11A illustrates an exemplary embodiment of a size adjusting circuit utilizing hydraulic pump motors.

The block diagram under FIG. 11A serves a purpose identical to the circuit of FIG. 10B above, but in the present case the circuit serves hydraulic or pneumatic dimension-changing systems rather than achieving the same purpose through electrical means as in FIG. 10B.

Specifically, numbered items 631-635 are either pressure pumps or pressure valves as described 231-235 in FIG. 11 above, including pumps or valves representing upper arm portion 632 (left, right); lower arm section 633 (L,R); torso 631T; upper legs 634 (L,R); and lower leg sections 635 left and right. Note that all left, right pumps or valves are paired (wired in parallel), such that any adjustment to one lower arm, for example, would normally make the same adjustment in the other as well.

The two sides of each pump motor or electrical valve coil are directed to a proxy dimension motor controller 650, which in turn receives data 651 representing programmed dimensions 652 which can be either entered locally 653 at the site of the proxy robot, whether in factory, home base or some remote location, or, more likely, as remote input 654 within the communication data stream from the mission base.

Note as well direct inputs 645-649 to each motor or pair. This allows dimension changing by the application of appropriate positive or negative DC current directly into the robot for testing, emergency situations, work-arounds and so forth.

FIG. 12 depicts a scenario distinct from that of FIGS. 1A-D, wherein a proxy robot 10 is purposely made to be twice the size of human handler 3.

Figure 12A:
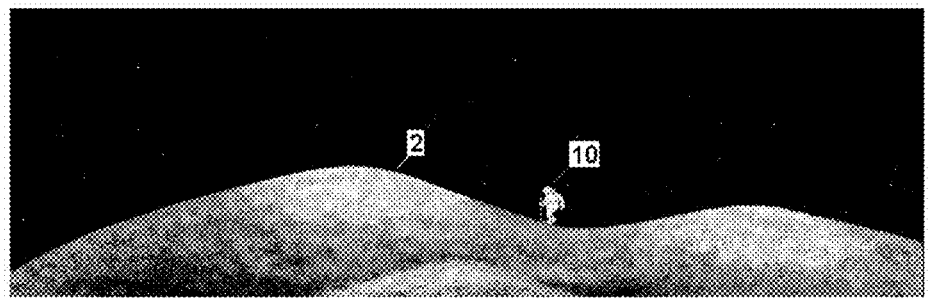
FIG. 12A illustrates an exemplary embodiment of a proxy robot of twice human size on the surface of a remote environment.

In FIG. 12A we see the same remote terrain as in FIG. 1A above, including hill 2. But note the size of proxy robot 10: twice the height, girth and other dimensions of proxy robot 1 in FIG. 1A.

Figure 12B:
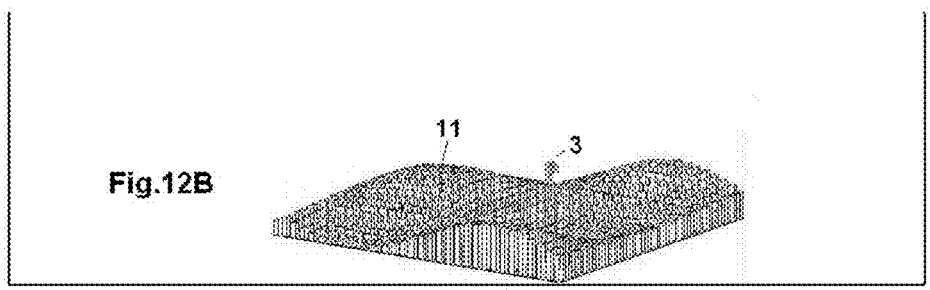
FIG. 12B illustrates an exemplary embodiment of a human handler on the surface of a half-scale simulated environment.

In FIG. 12B human handler 3 hasn't changed from the size depicted in FIG. 1B; what has changed, however, is the replicated environment 11 upon which handler 3 is walking or climbing. Note that this replicated environment 11 has been shrunken by its environment simulator to half normal size in all three dimensions (height, width and length). This adjustment of the replicated environment has the overall effect of making the human handler seem to be twice her or his normal size, giving that handler the situational feeling of being "inside" of proxy robot 10. Put another way, we cannot change the size of any given human handler to match that of a proxy robot so drastically distinct; what we can change instead is our replication of the simulated environment within which that human handler operates.

Figure 12C:
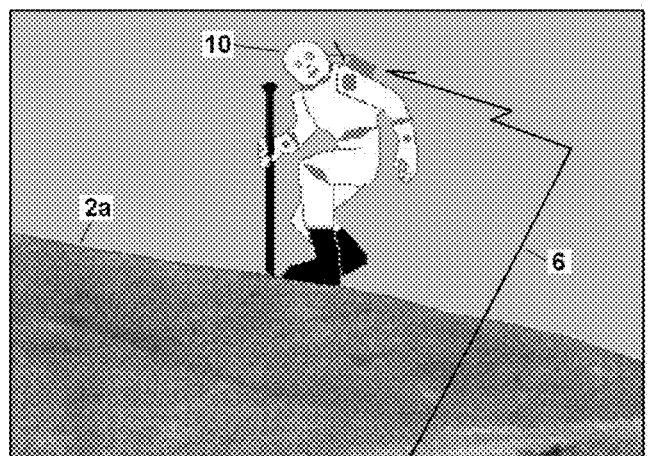
FIG. 12C illustrates an exemplary embodiment of a close-up view of a proxy robot in a remote environment.

FIG. 12C is a magnified view of that portion of FIG. 12A that includes proxy robot 10 climbing hill 2a, while line 6 continues to illustrate two-way communication between proxy robot 10 and human handler 3a.

Figure 12D:
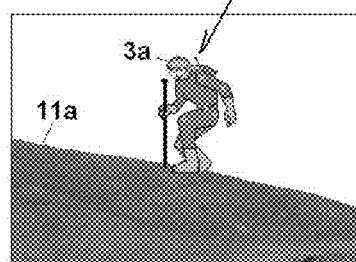
FIG. 12D illustrates an exemplary embodiment of a close-up view of a human handler in a half-scale simulated environment.

This connection 6 continues into FIG. 12D, with human handler 3a climbing a replica hill 11a that has been diminished by 50% in all dimensions and generated by an environment simulator as discussed above. Note that the proxy robot 10 has been intentionally constructed to be twice the size of human handler 3a. In consequence, replicated hill 11a is half the size of the actual hill 2a in FIG. 12C, generated in this diminished form by an environment simulator.

FIG. 13 shows still another scenario, wherein a proxy robot 15 is purposely made to be one-half the size of human handler 3.

Figure 13A:
FIG. 13A illustrates an exemplary embodiment of a proxy robot of half human size on the surface of a remote environment.

In FIG. 13A we see the same remote terrain as in FIG. 1A above, including hill 2. But proxy robot 15 is only half the height, girth and other dimensions of proxy robot 1 in FIG. 1A.

Figure 13B:
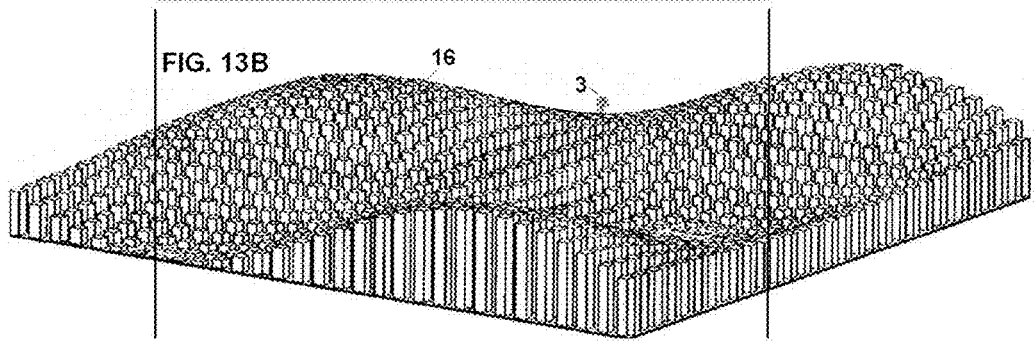
FIG. 13B illustrates an exemplary embodiment of a human handler on the surface of a twice-scale simulated environment.

In FIG. 13B, of course, human handler 3 hasn't changed from the size depicted in FIGS. 1B and 12B; what has changed is the replicated environment 16 upon which handler 3 is walking or climbing. In this case, environment 16 has been enlarged by its environment simulator to twice normal size in all three dimensions (height, width and length).

This adjustment of the replicated environment has the overall effect of making the human handler seem to be half her or his normal size, once again giving that handler the situational feeling of being "inside" of proxy robot 15: a small entity surrounded by unusually big rocks, craters and hills. As in FIG. 12B above, we cannot change the size of a human handler to match that of a drastically distinct proxy robot, but we can change our replication of the simulated environment within which that human handler operates.

Figure 13C:
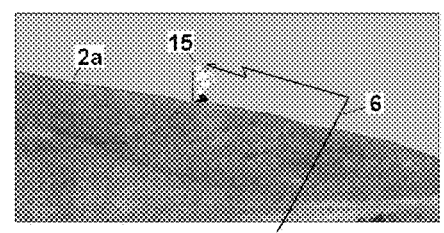
FIG. 13C illustrates an exemplary embodiment of a close-up view of a proxy robot of half human size in a remote environment.

FIG. 13C is a magnified view of the portion of FIG. 3A that includes proxy robot 15 climbing hill 2a, and line 6 continues to illustrate two-way communication between proxy robot 15 and human handler 3c below.

Figure 13D:
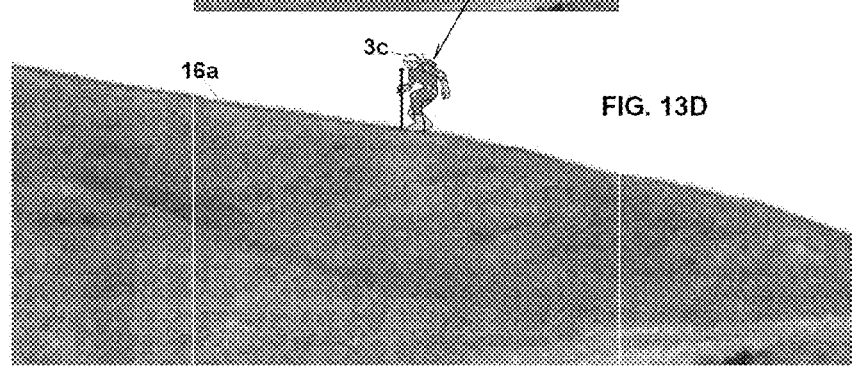
FIG. 13D illustrates an exemplary embodiment of a close-up view of a human handler in a twice-scale simulated environment.

This connection 6 continues into FIG. 13D, with human handler 3c climbing a replica hill 16a that has been enlarged to twice size in all dimensions, generated by an environment simulator as discussed above. Note that the proxy robot 15 has been intentionally constructed to be half the size of human handler 3c. Consequently, replicated hill 16a is twice the size of the actual hill 2, generated in this form by an environment replicator.

Thus it can be seen that proxy robots of virtually any size can be utilized in space as well as at disaster scenes or other situations on Earth. As long as apparent proportions between a proxy robot and its human handler remain similar, the proxy robot can be made many times smaller or larger that its human counterpart, with the replicated environment of the human handler scaled to give that handler a proxy robot-eye view of the surroundings.

Figure 14A:
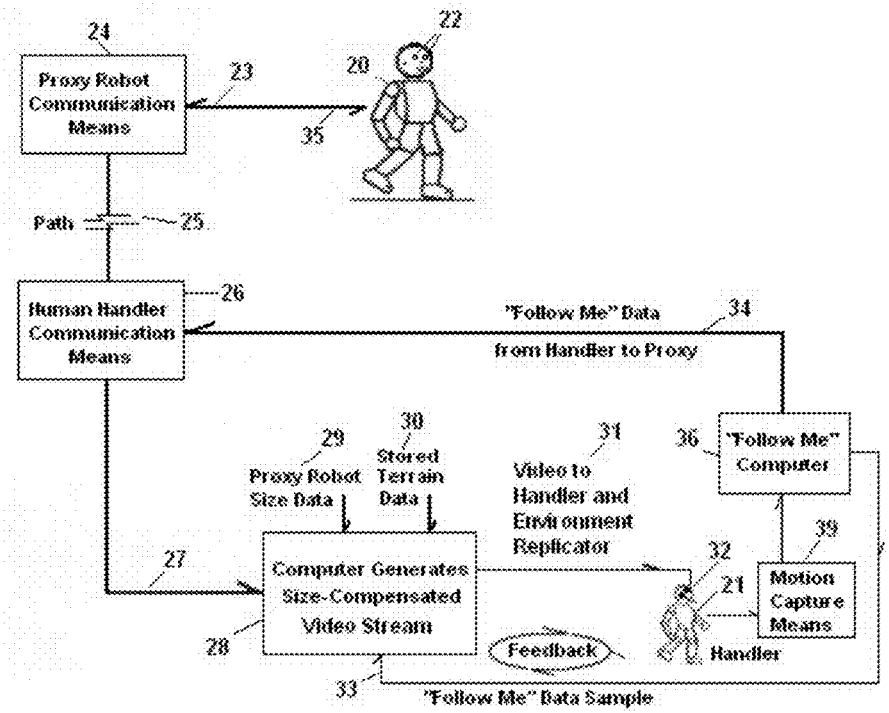
FIG. 14A illustrates an exemplary embodiment of a remote proxy robot with replicator size compensation.
Figure 14B:
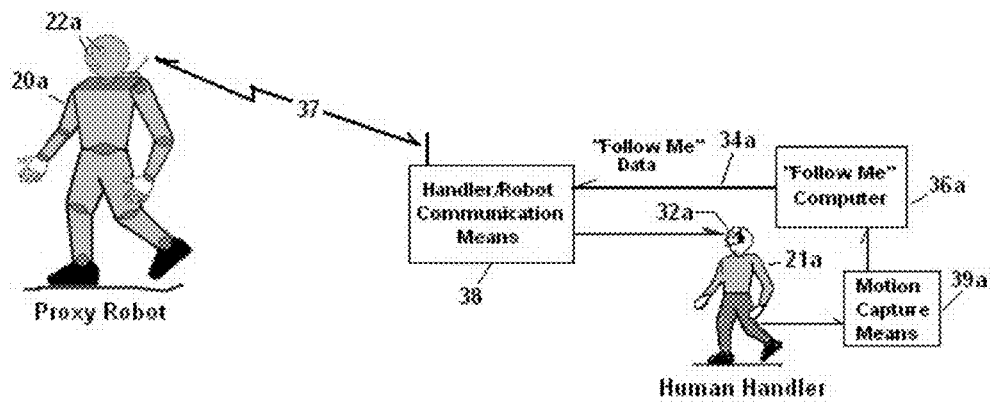
FIG. 14B illustrates an exemplary embodiment of proxy robot video with local size compensation.

FIGS. 14A and 14B depict the situation of FIG. 2 above, wherein a human handler guides a remotely-located proxy robot of twice the handler's size.

FIG. 14A is a block diagram of a virtual video generation environment including size compensation means in keeping with the scenarios discussed in FIGS. 1A-D, 2 and 3 above. Specifically, a proxy robot 20 is traversing a location remote from a handler 21. In the drawing, the handler sends follow-me commands to the proxy robot 20 that dictate the robot's every move.

Video from at least two eye cameras 22 in the head of the proxy robot 20 is sent 23 along with other data from the remote location to proxy robot communication means 24, which can include a data aggregator, at least one transmitter, and an antenna. The aggregated signals are transmitted over a path 25, received by human handler communication means 26, and sent 27 to a computer 28 which serves to generate size-compensated virtual video. Computer 28 is a terrain analysis computer, receiving video, positional and other data from the remote site as well as stored data 30 about the remote terrain in the active mission area.

Computer 28 also receives information 29 regarding the size of proxy robot 20 relative to the size of human handler 21. From all data sources 27, 29 and 30, computer 28 generates a virtual video stream 31 that feeds a video display such as a 3-D head mounted display 32. The virtual video stream 31 is not only a highly accurate representation of the terrain surrounding proxy robot 20, but also is scaled to put the human handler 21 in the boots of the proxy robot 20. Put another way, if the relative sizes of proxy and handler are 1:1, computer 28 would render the virtual video stream 31 in normal size, but if the proxy 20 is twice the size (2:1) of the handler 21 as depicted in FIG. 4, virtual video 31 from computer 28 will be diminished to 50% (or 1:2, an inverse proportional relationship: c.f. FIG. 12 above).

If an environment replicator like the one depicted in FIG. 1 above is employed by the human handler, a remote terrain data sample 31 from computer 28 is also sent to the environment simulator so it can provide the most accurate rendering possible of the remote mission terrain.

Conversely, if robot 20 is only half the size (1:2) of handler 21, virtual video 31 from computer 28 is expanded to twice size (2:1: c.f. FIG. 3 above). The end effect is to put human handler 21 in the boots of proxy robot 20: seeing through the proxy's eye cameras and directing its every step by capturing each motion of the handler via one of a variety of motion capture means 39 described in FIG. 17 below and in other patent applications of the inventor. The motion capture means 39 directs all handler motion information to a follow-me computer 36 which translates handler motion information into a continuous stream of data 34 transmitted by human handler communication means 26 over path 25 and received by proxy robot communication means 24 for direction 35 to various motors and actuators (not shown) in proxy robot 20.

A follow-me data sample 33 is also sent back to computer 28, in a feedback loop that enables computer 28 to instantly compensate for direction shifts and other body movements from handler 21.

FIG. 14B depicts a human handler 21a guiding every movement of a proxy robot 20a of twice the human's size, like the situation in FIG. 14A above. In the case of FIG. 14B, however, proxy 20a is local to handler 21a, such that there is no significant path delay in the communication back and forth between the robot and its handler. In this scenario, video from the eye cameras 22a of proxy robot 20a goes over a local path such as radio path 37 to handler/robot communication means 38.

The live video generated by proxy robot eye cameras 22a and received by handler/robot communication means 38 is streamed without modification to a video display seen by human handler 21a, which may be a head-mounted display 32a as shown. If the distance between robot 20a and human 21a were sufficiently short, the entire video path 37-38 could be over a cable rather than a radio transmission path.

Whatever the path, video from a proxy robot of any size relative to the human handler still gives the handler the feeling of being "inside" the proxy robot, guiding its every step and movement, as long as proportions between joints, eye spacing and eye distance over shoulders generally match between proxy and handler.

A computer is required at the simulator end of things when a dynamic environment replicator like that featured in FIGS. 1A-D, 12 and 13 is employed. In this case, terrain data from the proxy robot site is processed to meet the needs of the simulator (see computer 544 in FIG. 1F above).

As in FIG. 14A, motion capture means 39a monitors the handler's every movement and continuously streams the results to follow-me computer 36a. The follow-me data 34a from computer 36a travels via handler/robot communication means 38 and over path 37 back to proxy robot 20a to guide the robot's every step and movement.

FIG. 15 illustrates a novel giant tilt table approach to an environment simulator with omnidirectional yaw (heading or bearing) and widely-variable pitch (front-rear tilt) and roll (left-right tilt) capabilities. Co-pending U.S. patent application Stephens '437 cited above describes various environment simulators with similar capabilities, but does not include a giant tilt table environment simulator with characteristics like those herein described.

Figure 15A:
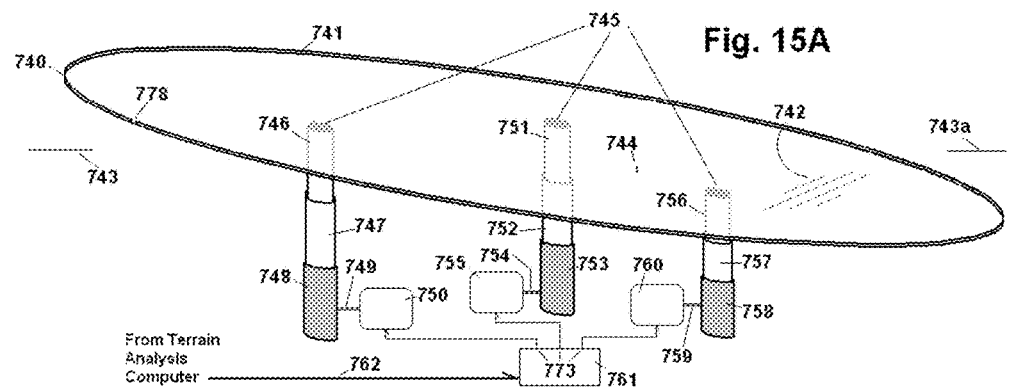
FIG. 15A illustrates an exemplary embodiment of an illustration of the elements of a giant tilt table.

FIG. 15A depicts such a giant tilt table 740, a room-size disc-shaped element with perimeter rim/guard-rail 741 and thickness sufficient to sustain the weight of at least one heavy human handler 744 (see FIG. 15E) anywhere on its surface 742, whether the handler is stationary, moving, jumping or performing any other activity. In the drawing, tilt table 740 is tilted downward (drawing right) approximately 15 degrees as compared with horizontally level line 743, 743a. Tilting a large room-size surface (of one-hundred feet or greater diameter: see tiny human handler 744 for comparison) is no easy feat, so surface 742 rests upon at least three large telescoping extendable legs 746-748, 751-753 and 756-758, spaced equidistant from the center of surface 742.

Figure 15C:
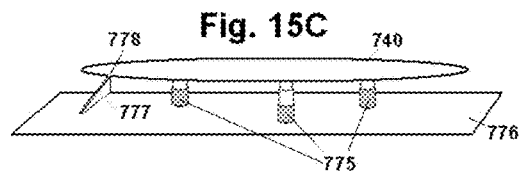
FIG. 15C illustrates an exemplary embodiment of a side view of the giant tilt table.
Figure 15B:
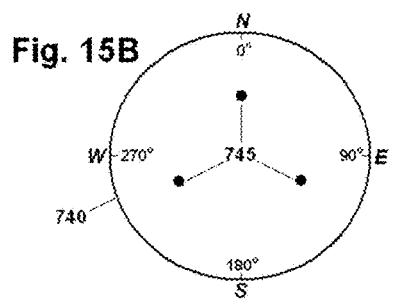
FIG. 15B illustrates an exemplary embodiment of points of contact between a giant tilt table and its legs.

FIG. 15B depicts this spacing of leg contact points 745 in an overhead view which also shows Earth true north (0 degree), east (90 degree), south (180 degree) and west (270 degree) fixed markings. This orientation with Earth coordinates is important to the orientation and positioning of a remote proxy robot similarly aligned with its own planetary environment, whether robot north represents true north there or some defined mission north.

FIG. 15C is a plane view depicting giant tilt table 740 at rest and completely horizontal, without tilt in any direction. In this depiction, the three extendable legs 746-748, 751-753 and 756-758 of FIG. 15A, all numbered 775 in FIG. 15C for simplicity, are mounted to a horizontal subfloor 776. A ramp with stairs 777 allows a human handler to ascend to access a portal 778 in the rim 741 of giant tilt table 740. In their horizontal, resting position, all extendable legs 775 are at the mid-point in their extension, allowing each leg to extend or contract when called upon to generate the roll and/or pitch required by any terrain simulation or replication situation. Human handler 744 can walk to and start in any position on tilt table 740, simply signaling when she or he is ready to commence active operation in the mission at hand.

Figure 15D:
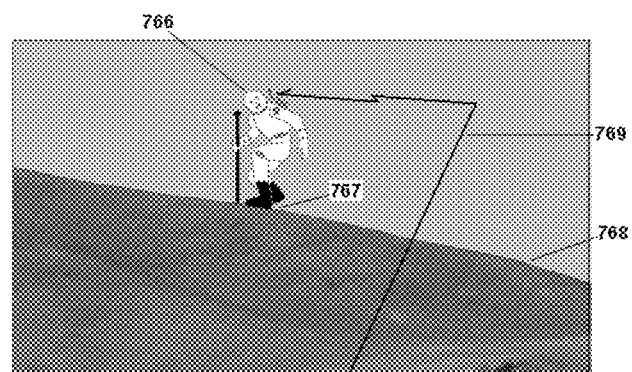
FIG. 15D illustrates an exemplary embodiment of a close-up view of a proxy robot in a remote environment.

FIG. 15D. Terrain analysis computer 772 receives data over path 69 about the immediate terrain 767 under proxy robot 66. When operation commences, this information is translated by control electronics 61 into roll and pitch-driving signals for the legs 775 of tilt table 740 at some particular robot and handler heading (yaw).

In FIG. 15A, it can be seen that an extendable leg section 746 protrudes from section 747 which in turn protrudes from bottom section 748, but of course the sections of each leg can be greater or lesser in number. In like manner, top section 751 of another extendable leg protrudes from middle section 752 which in turn protrudes from bottom section 753; and the top section of at least a third leg 756 protrudes from middle section 757 which in turn protrudes from bottom section 758 in the exemplary embodiment.

Corresponding to each of the leg bottom sections 748, 753 and 758, a box 750, 755 and 760 is shown connected via lines 749, 754 and 759 respectively. In a presently-preferred embodiment of the invention, each of the boxes 750, 755 and 760 represents a hydraulic pump and electrically-activated valve assembly, and each of the connection lines 749, 754 and 759 represents a fluid line to a hydraulic cylinder within each leg bottom section 748, 753 and 758, respectively. In this embodiment of the invention, control electronics 761 connects electrically 773 to each of the hydraulic pump and electrically-activated valve assemblies 750, 755 and 760 to add or subtract hydraulic fluid from each leg to make that leg extend or contract.

Figure 15E:
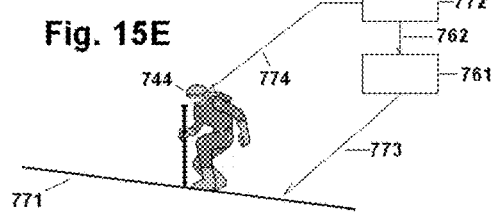
FIG. 15E illustrates an exemplary embodiment of a close-up view of a human handler on a section of a giant tilt table in a simulated environment.

FIG. 15E: Operation of the giant tilt table's hydraulic legs is as follows. A terrain analysis computer 772, similar to computer 28 in FIG. 14A above, generates signals 762 fed to tilt table leg extending/contracting control electronics 761 representing the precise amount of roll and pitch 771 required immediately under human handler 744 facing in some already-determined direction and position on the tilt table. The reading of the remote proxy robot's bearing (yaw) is necessary not only to the generation of an appropriate ART video stream 774 by computer 772 to maintain human handler 744 informed of the robot's position and situation, but also because the proxy robot's bearing is what determines the relative proportions of the robot's pitch (front/rear tilt) and roll (tilt to the robot's right and left).

Alternatively, giant tilt table legs 775 may operate from other means like motors or electromagnetics. For example, screw motors might be used instead of hydraulics to raise and lower each leg. Applying this alternative to leg 746-748 in FIG. 15A would have that leg resting at midpoint through the threads on a large shaft, turned in one direction or the other in turnbuckle fashion to extend and retract the mechanism and thus the entire leg. In such an alternative example, box 750 would represent that leg's motor, and line 749 would be a mechanical coupling from motor to screw shaft. Although such a motor may employ gears and solenoids to reverse direction, a D.C. motor is considered more practical because of the simplicity of reversing the D.C. polarity on that motor to reverse its direction of rotation. In all scenarios, box 761 would still represent control electronics: only the nature of its output would change to match whatever motor or pump is utilized to drive the legs up and down.

In every case, computer 772 must also take into account the handler's precise position on the tilt table, since handler position is also a determinate of how much the computer will expand and contract various giant tilt table legs 775 to generate roll and pitch beneath the handler's boots to approximate those same conditions under the boots of the remote proxy robot 766.

The giant tilt table of this disclosure cannot fine tune pitch and roll individually under each boot of the handler because of the single-surface nature of the apparatus. On the other hand, such a giant tilt table approach is simpler and less costly than simulators with thousands of computer-operated pistons (FIG. 1B) or giant spherical treadmills (FIGS. 8-9). In the figure to follow, still another approach to environment simulation will be explored and discussed.

Drawing from previously-cited Stephens '437, FIG. 16 depicts two novel environment simulators that utilize room-size terrain replicators to simulate a remote environment such as that of the Moon or Mars.

FIG. 16A topographically illustrates terrain 790 at a remote site such as the Moon, while FIG. 16B demonstrates how the terrain in FIG. 16A can be rendered into a three-dimensional (3-D) bar chart 791. FIG. 16B has a plurality of individual bar elements 792, with each bar representing average height above some zero reference baseline 791a, 791b. In the illustration, individual bar elements 792 in FIG. 16B and FIG. 1B above are shown quite large for clarity; in actual practice each bar can represent a finer area of one or two square inches. The point of FIG. 16B is to illustrate how, utilizing current technology, three-dimensional topographies can be rendered into 3-D bar charts.

FIG. 16C depicts a novel method of replicating 796 the topography shown in FIG. 16A, through the employment of a multi-nozzle jet 3-D fabrication device 793 of the size of the baseline (room floor) stage area or some fraction thereof. In the latter case, the 3-D fabrication device completes a section, then moves to another area on the room floor to repeat the process.

FIG. 16D is a magnified view 801a of the underside of one section 801 of 3-D fabrication device 793, depicting a plurality of rows 795 of individual nozzle jets 794. In 3-D fabrication device 793 in FIGS. 16C and 6D each individual nozzle jet receives appropriate build-up material (not shown) such as plastic in liquid form, and ejects the build-up material out of nozzle jets 794 for a period of time in proportion to the amount of build-up dictated for each individual area corresponding to one bar 792 on the bar chart 791 in FIG. 16B. Thus it can be appreciated that areas corresponding to higher elevations receive more build-up material than lower elevation areas. As each individual area reaches its elevation point, the nozzle jet corresponding to that point ceases dripping, secreting or spraying build-up material, until a point is reached where the highest elevation areas have received all the build-up material they require, and the build-up material cures or sets to form a hard 3-D replica 796 of area 790 as rendered by 3-D fabrication device 793.

FIG. 16E depicts another 3-D fabrication device 797 for replicating 800 the topography shown in FIG. 16A. This 3-D fabrication device 797 employs a scanning multi-nozzle jet bar 798 the length of one side of the replication room stage, or some fraction thereof. As above, a smaller 3-D fabrication device can complete one topography section before moving to another.

FIG. 16F is a magnified view 798a of the underside of a section of multi-nozzle bar 798 in 3-D fabrication device 797, depicting a row of individual nozzle jets 799. As scanning multi-nozzle jet bar 798 in 3-D fabrication device 797 in FIGS. 16E and 16F scans across the replication area, each individual nozzle jet ejects appropriate build-up material (not shown) such as plastic in liquid form, forcing the build-up material out of nozzle jets 799 for a period of time in proportion to the amount of build-up dictated for each individual area corresponding to one bar 792 on the bar chart 791 in FIG. 16B. As in FIGS. 16C and 16D above, areas corresponding to higher elevations receive more build-up material than lower elevation areas. As each individual area reaches its elevation point, the nozzle jet corresponding to that point will cease dripping, secreting or spraying build-up material as it scans across that particular spot, until a point is reached where the highest elevation areas have received all the build-up material they require, and the build-up material cures or sets to form a faithful 3-D replica 800 of area 790 as rendered by 3-D fabrication device 797.

The build-up material from which the replicated topographies of FIG. 16 are constructed may be re-usable. For example, a certain type of plastic or polymer can be selected with a low melting point and the ability to revert to its original liquid state with a simple temperature rise. Or the material can employ a hardener in a reversable process wherein a solvent counters the hardening effect and likewise reverts the build-up material to its original liquid state for re-use. Still another method of recycling involves the use of self-hardening foam overcoated by stronger material such as plastic or polymer. Even if not reusable on-site, the foam's consistancy could permit commercial recycling.

The above concepts assume that most replicated terrains would eventually be replaced by new topographical replications, but in fact many may not need recycling: consider the value of interlocking room-size replications removed from the environment simulator site and joined to form sections of Mars or the Moon for institutional study, practice space exploration and theme parks for the general public to enjoy.

FIG. 17 describes a simple method of motion capture useful in tracking the movements of a human handler utilizing dark, non-reflective handler attire upon which white, reflective or brightly-colored arrows, joint markings, connecting lines and other symbols are placed such that they can be read by a computer to generate follow-me commands for the handler's proxy robot (c.f. FIG. 1E-G). The present disclosure adds new motion capture means to Stephens' co-pending U.S. patent application Ser. No. 13/479,128, entitled "Space Exploration with Human Proxy Robots," filed on May 23, 2012 and incorporated in its entirety herein by reference.

FIG. 17A depicts a front view of handler 849a in a body suit or otherwise attired to display simple markings 851a-860a on his/her clothing, skull cap, head mounted display, gloves and footwear. Specifically, a series of lines 854, larger joint-markings 855, combinations of line and joint markings 856 (essentially following bones and joints in the hands), arrows 851a (on skullcap, facing forward) 860a (on footwear, facing forward), and special markings 853 (over the handler's eyes) and 857 (over the front of the handler's neck) trace a frontal view of the handler complete enough, when combined with other views in FIG. 17, for a computer to utilize to capture the handler's essential motions and translate them into meaningful follow me commands for a proxy robot to emulate.

In the drawing, joint markings 855 appear at the base of the neck of handler 849a; at the handler's shoulder joints, mid-arm joints, wrist joints, finger and thumb joints, lower spine joint, upper leg joints, mid-leg joints, ankle joints and general foot areas, all connected together by lines 854. When included with the directional arrows and special markings mentioned above, these markings give a very complete frontal view of the handler 849a in any body position.

FIG. 17B is a right side view of the same handler, now designated 849b. In this and figures to follow, only new markings will be called out, since markings on the gloves, for example, remain as explained and enumerated under FIG. 17A. Moving top to bottom in FIG. 17B, arrow 851b on the scull cap 850b of handler 849b is another forward-pointing arrow on the right side of the cap, and right-side joint markings 862 are connected by connecting lines 861. On the outside of each boot or shoe 859 is another forward-pointing arrow (860b is the only arrow visible, on the outside of the right boot). As in FIG. 17A above, in combination these lines and markings give a computer a very complete right side view of handler 849b in any body position.

FIG. 17C is a rear view of the handler, now numbered 849c. Here we see still another forward-pointing arrow 851c in the middle of scull cap 850c, which extends upward toward the midpoint of the cap. Rear joint markings 864 are connected together by connecting lines 863, and in combination these lines and markings can give the motion capture data aggregator 521 and follow me computer 523 a good view of handler 501 (all in FIG. 1F) in any body position 849a-849f.

FIG. 17D is a left-side view of the same handler, now designated 849d. Moving top to bottom in FIG. 17D, arrow 851d on the scull cap 850d of handler 849d represents still another forward-pointing arrow on the left side of the cap, and left-side joint markings 866 are connected by connecting lines 865. On the outside left boot or shoe 859 is another forward-pointing arrow 860d. Mirroring FIG. 17B, in combination these lines and markings give a computer a very complete left side view of handler 849d in any body position.

FIG. 17E is a top-down view of the same handler, now 849e. Forward-pointing arrow 851e is the same as arrow 851a in FIG. 17A, and another forward-pointing arrow 875 appears on the handler's right shoulder. A few new joint markings 868 atop the handler's shoulders are connected by lines 867. Right 869a and left 869b gloved hands of handler 849e are plainly visible in this view, but FIG. 17E also depicts an alternative footwear option wherein handler 849e is wearing flexible booties or stockings rather than boots or shoes, a scenario that could be very useful in some exploration situations. A set of bootie joint markings and connecting lines together designated 870 are clearly visible for this option. Motion capture cameras view the handler from the front 871a, right side 871b, rear 871c and left side 871d, and since a top-down view like FIG. 17E can more clearly show the handler taking steps than other views, an overhead camera motion capture camera 871e (shown in FIG. 17F to follow) captures handler movements from this perspective.

FIG. 17F is included to convey how combining the views in FIGS. 17A-17E from cameras 871a-e can render the handler in three-dimensional space. Although a very course build of 3-D blocks is depicted for clarity, real motion-capture from the five camera angles can produce resolutions thousands of times higher. FIG. 17F shows vertical axis 872, horizontal axis 873 and an axis 874 representing depth, with resulting 3-D blocks surrounding the handler, now designated 849f.

The 3-D grid 872, 873, 874 can of course extend much further from the human handler in all directions, giving a computer the ability to construct and stream follow-me commands to a proxy robot emulating the moves of its human handler.

Because the handler is able to turn in any direction and therefore be seen in different angles by the motion capture cameras 871a-d, markings on the handler's suit also include information about which way the handler is facing. For example, in the frontal view of FIG. 17A, open circles 880 on connecting lines denote front side, while solid squares 881 appear on the handler's right side in right view FIG. 17B. The rear view of FIG. 17C shows open 882 rather than solid squares, while parallel lines 883 denote the handler's left side in FIG. 17D.

The placing of white, reflective or brightly-colored lines, joint markers and directional arrows upon darker, non-reflective clothing worn by a human handler makes the essential elements of motion in that handler highly accessible to a computer reading visual clues—particularly if the handler's background is either dark and non-reflective or a solid color such as the blue or green screens employed in television and motion pictures. In motion capture, the background simply disappears, enabling the computer to render an animated graphic stick figure in place of the handler that can be readily translated into a stream of follow-me commands for the guidance of a proxy robot remote from the handler.

In FIG. 17G, eight stick figure views of a handler in various positions illustrate what the computer can receive from one of the five exemplary cameras: 871a-d in FIG. 17E and 871e in FIG. 17F. View 886 is from the front, with open circles between joint markers, and corresponds to FIG. 17A (the handler's head has been circled in black in all figures for clarity), while 887 is a right side view (note the solid squares) of a handler walking. In 888, also right side, the handler is running, while 889 is a left side view (note the parallel line markings) of a handler in a balanced stance. In 890, the handler (still left side view) has bent down to pick up something; in 891 (right side view) the handler lifts an object; and in 892 (also right side) the handler balances a large object.

At bottom right is an overhead view of a handler 893, whose body 894 faces approximately 130 degrees true north (horizontal grid line 897 runs west-east and vertical line 898 runs north-south), as do the handler's feet 895a (right) and 895b (left). Note that the handler's head 896 is turned to the right, to about 150 degrees true.

The position and motion data from the various views of the marked human handler of FIGS. 17A-G provide ample information for a computer such as follow-me computers 36, 36a in FIG. 14 to translate into a continuous stream of follow-me commands to guide every motion and step of a proxy robot. Put another way, the "stick figure" markings on the human handler in FIGS. 17A-G constitute in themselves a motion capture means.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of any claims. As such, the present teachings can be readily applied to other types of apparatus and many alternatives, modifications, and variations will be apparent to those skilled in the art.

I claim:

1. A method for exploring by a proxy robot a remote environment including a location on the surface of the Moon or Mars (remote environment) from an environment simulator or terrain replicator (simulator) at a local base on Earth (local base) comprising:

placing an upright proxy robot at a predetermined location in the remote environment;

deploying surveillance devices on a surface of and above the remote environment to capture images and data pertaining to the remote environment;

activating on the proxy robot a plurality of video cameras (PR cameras) including at least one near field camera and at least one high resolution far field video camera;

capturing by the PR cameras video of the remote environment from a terrain immediately surrounding the proxy robot to a 360-degree sight horizon of the PR cameras;

aggregating the video from the PR cameras with the images and data from the additional surveillance devices;

transmitting the aggregated video and data signals to the local base;

directing via a receiver at the local base the aggregated video and data signals to a terrain analysis computer;

generating by the terrain analysis computer a 360-degree approximated real time (ART) video field precisely representing the terrain surrounding the proxy robot at the remote environment;

directing at the local base video from the 360-degree ART video field to a display in a simulator;

capturing in the simulator by a plurality of motion-sensing video cameras video signals representing each move or position change in an individualized full body motion capture suit (MC body suit) marked to the dimensions of a user, wherein activities performed virtually in the 360-degree ART video field of the display means in the simulator represent the same activities to be performed by the proxy robot in the terrain of the remote environment;

sending the video signals from the motion-sensing video cameras to a follow-me data computer to produce follow-me data signals;

feeding back a sample of the follow-me data signals reflecting each position change from the MC body suit to the terrain analysis computer for continuous updating of the 360-degree ART video field for the display;

transmitting the follow-me data signals to the remote environment;

translating at the remote environment the follow-me data signals by a follow-me data translator into data code addressable to each mechanical movement device in the proxy robot, wherein the proxy robot moves through the remote environment by emulating each move and position change in the MC body suit at the local base;

receiving at the local base 360-degree video from each new position of the proxy robot; and transmitting continuously updated follow-me data signals from the local base to the proxy robot in the remote environment.

2. The method of claim 1, wherein the high resolution far field video camera comprises a single camera pointing at right angles to the horizon directly toward the tip of a 45-degree cone with reflective surface to capture a 360-degree view around the proxy robot.

3. The method of claim 1, wherein the high resolution far field video camera obtains its 360-degree view by aiming into a circular curved reflective surface, with any distortions introduced by the optics being eliminated by corrective software or hardware.

4. The method of claim 1, wherein the video from the high resolution far field video camera is stabilized to compensate for unintended motion and vibration.

5. The method of claim 1, wherein the terrain analysis computer at the local base initially generates the ART video field from the aggregated video and data from the remote environment and thereafter modifies the ART video field to precisely represent the terrain surrounding the proxy robot in accordance with feedback received from the changing positions of the MC body suit.

6. The method of claim 1, wherein the terrain analysis computer at the local base receives and processes updated video from the PR cameras as the proxy robot moves in response to the follow-me data signals from the local base.

7. The method of claim 1, wherein the remote environment simulator at the local base includes an omnidirectional treadmill to accommodate changes in user movement and yaw.

8. The method of claim 7, wherein the stage of the omnidirectional treadmill includes mechanical devices to raise and lower at least three points equidistant around its perimeter to create changes in pitch and roll in the simulated environment to mimic pitch and roll conditions that will exist beneath the feet of the proxy robot in the remote environment.

9. The method of claim 7, wherein the omnidirectional treadmill comprises the top surface area of a giant sphere with a diameter of at least 30 feet and includes mechanisms to change the location of a user on the surface of the sphere to mimic pitch and roll conditions that will exist beneath the feet of the proxy robot in the remote environment.

10. The method of claim 1, wherein the remote environment simulator at the local base comprises a giant tilt table of at least 100 foot diameter mounted on mechanisms to raise and lower at least three points equidistant from each other and from table center to create changes in pitch and roll in the simulated environment to mimic pitch and roll conditions that will exist beneath the feet of the proxy robot in the remote environment.

11. The method of claim 1, wherein the remote terrain replicator at the local base generates a three-dimensional bar chart representing the remote terrain and translates each bar element into a physical rendering of the height of a section of the remote environment represented by that bar element.

12. The method of claim 5, wherein the terrain analysis computer translates the ART video field data into signals for an environment simulator driver at the local base.

13. The method of claim 12, wherein the environment simulator driver causes changes in simulator yaw, pitch and roll duplicating changes in yaw, pitch and roll to be found in the remote environment.

14. A system for the exploration of a remote environment including a location on the surface of the Moon or Mars from an environment simulator at a local base on Earth by a proxy robot at the remote location, comprising:

at least one proxy robot in the remote environment with a near-field video camera and a high resolution 360-degree far field video camera;

at least one additional surveillance device at the remote environment to capture images and data pertaining to the remote environment;

a transmitter device at the remote environment to transmit the video and data signals over a path to the local base;

a receiver device at the local base to receive the video and data signals from the remote environment;

a terrain analysis computer at the local base to receive and process the video and data signals to generate a 360-degree approximated real time (ART) video field representing a terrain surrounding the at least one proxy robot in the remote environment;

a display device in the environment simulator at the local base to receive and display the ART video field for at least one user;

a full body motion capture suit externally marking the dimensions of the at least one user in the environment simulator, a plurality of motion capture video cameras at the local base to capture video signals representing each move or position change in the full body motion capture suit;

a follow-me data computer at the local base to receive the video signals from the plurality of motion capture video cameras, wherein the follow-me data computer processes the motion capture video signals into a follow-me data stream for transmission to a follow-me data translator at the remote environment, and wherein the follow-me data computer further generates and feeds back data representing changes in the full body motion capture suit to the terrain analysis computer for continuous updating of the ART video for the said display device in the environment simulator or the terrain replicator to reflect positional changes from the full body motion capture suit;

a follow-me data translator at the remote environment to translate the follow-me data train into data code addressable to each motor system in the at least one proxy robot to cause the proxy robot to move through the remote environment by emulating every move and position change in the full body motion capture suit at the local base.

15. The method of claim 1, wherein a dark full body motion capture suit is brightly marked with skeletal lines and symbols representing joints, hand and finger positions, and the orientation of shoulders, boots and headwear for capture by motion capture cameras.

16. The method of claim 1, wherein the video from the motion-sensing video cameras is converted into a stick figure in three-dimensional motion and translated into a continuous stream of follow-me commands to guide every motion and step of the proxy robot.

17. The method of claim 11, wherein each bar element is translated into a signal which pushes a piston to an appropriate height.

18. The method of claim 11, wherein each bar element section comprises material added to build the section to the appropriate height.

19. The method of claim 11, wherein the scale of the environment replicated by the terrain replicator is in inverse proportion to the size of a proxy robot in the remote environment relative to the size of a user at the local base.

20. The method of claim 1, wherein the plurality of video cameras on the proxy robot includes left and right eye cameras in the head of the proxy robot to produce 3-D video.

21. The method of claim 1, wherein the high resolution far field video camera rotates to capture a 360-degree view of the terrain surrounding the proxy robot.

22. The method of claim 1, wherein the high resolution far field video camera utilizes rotating prisms or mirrors to capture a 360-degree view of the terrain surrounding the proxy robot.

* * * * *